(12) United States Patent
Gao et al.

(10) Patent No.: US 9,646,389 B2
(45) Date of Patent: May 9, 2017

(54) SYSTEMS AND METHODS FOR IMAGE SCANNING

(71) Applicant: QUALCOMM Incorporated, San Diego, CA (US)

(72) Inventors: Dashan Gao, San Diego, CA (US); Xin Zhong, San Diego, CA (US); Ananthapadmanabhan Arasanipalai Kandhadai, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 14/624,291

(22) Filed: Feb. 17, 2015

(65) Prior Publication Data

US 2016/0063727 A1 Mar. 3, 2016

Related U.S. Application Data

(60) Provisional application No. 62/042,161, filed on Aug. 26, 2014.

(51) Int. Cl.
| | |
|---|---|
| *G06K 9/00* | (2006.01) |
| *G06T 7/20* | (2017.01) |
| *G06K 9/32* | (2006.01) |
| *G06K 9/46* | (2006.01) |
| *G06T 7/246* | (2017.01) |
| *G06T 7/207* | (2017.01) |

(52) U.S. Cl.
CPC ............ *G06T 7/20* (2013.01); *G06K 9/00335* (2013.01); *G06K 9/00771* (2013.01); *G06K 9/3241* (2013.01); *G06K 9/4642* (2013.01); *G06T 7/207* (2017.01); *G06T 7/248* (2017.01); *G06T 2207/10016* (2013.01); *G06T 2207/20016* (2013.01)

(58) Field of Classification Search
CPC ........... G06K 9/00335; G06K 9/00771; G06K 9/3241; G06T 2207/10016; G06T 7/20; G06T 7/204; G06T 7/2073
See application file for complete search history.

(56) References Cited

U.S. PATENT DOCUMENTS

| | | | |
|---|---|---|---|
| 8,160,370 | B2 | 4/2012 | Liu et al. |
| 8,340,354 | B2 | 12/2012 | Sharma |
| 8,538,081 | B2 | 9/2013 | Ding et al. |
| 2013/0266177 | A1 | 10/2013 | Sanches |

(Continued)

OTHER PUBLICATIONS

International Search Report and Written Opinion—PCT/US2015/042949—ISA/EPO—Nov. 9, 2015.

(Continued)

*Primary Examiner* — Siamak Harandi
(74) *Attorney, Agent, or Firm* — Austin Rapp & Hardman, P.C.

(57) ABSTRACT

A method for image scanning by an electronic device is described. The method includes obtaining an image pyramid including a plurality of scale levels and at least a first pyramid level for a frame. The method also includes providing a scanning window. The method further includes scanning at least two of the plurality of scale levels of the frame at a plurality of scanning window locations. A number of scanning window locations is equal for each scale level of the at least two scale levels of the first pyramid level.

24 Claims, 21 Drawing Sheets

(56) References Cited

U.S. PATENT DOCUMENTS

2013/0287251 A1* 10/2013 Mitsui ................. G06K 9/6267
                                                          382/103
2013/0301930 A1    11/2013 Vigliar et al.
2014/0023279 A1     1/2014 Fahn et al.
2014/0205141 A1*    7/2014 Gao ........................ G06T 7/20
                                                          382/103

OTHER PUBLICATIONS

Pedersoli M., et al., "Efficient discriminative multiresolution cascade for real-time human detection applications," Pattern Recognitionletters, vol. 32, No. 13, Jun. 25, 2011 (Jun. 25, 2011), pp. 1581-1587, XP028273562, ISSN: 0167-8655, DOI: 10.1016/J.PATREC.2011.06.019.

Zhang W., et al., "Real-time Accurate Object Detection using Multiple Resolutions", Computer Vision 2007, ICCV 2007,IEEE 11thInternational Conference on, IEEE, PI, Oct. 1, 2007 (Oct. 1, 2007), pp. 1-8, XP031194546, DOI: 10.1109/ICCV.2007.4408949, ISBN: 978-1-4244-1630-1.

* cited by examiner

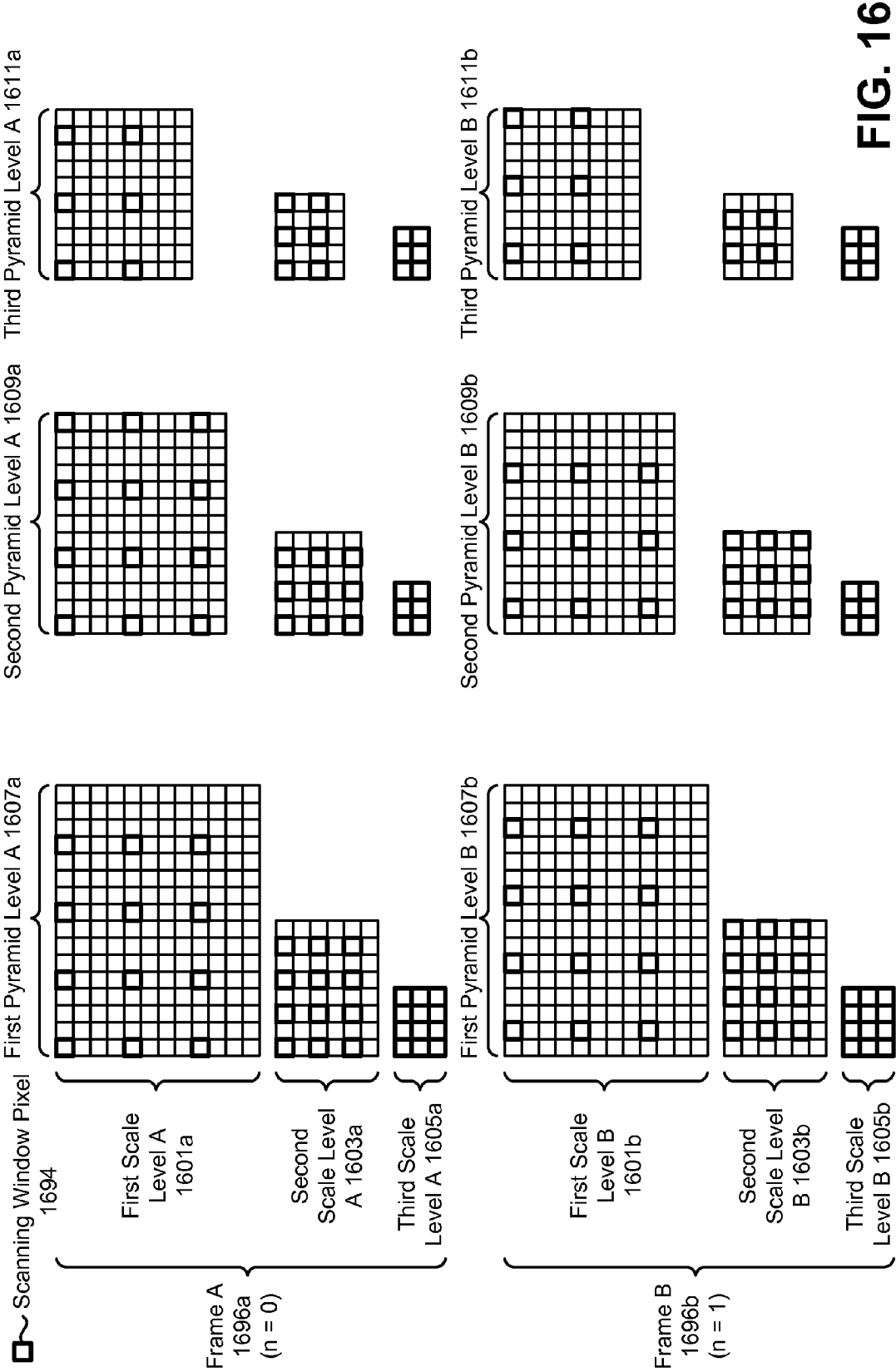

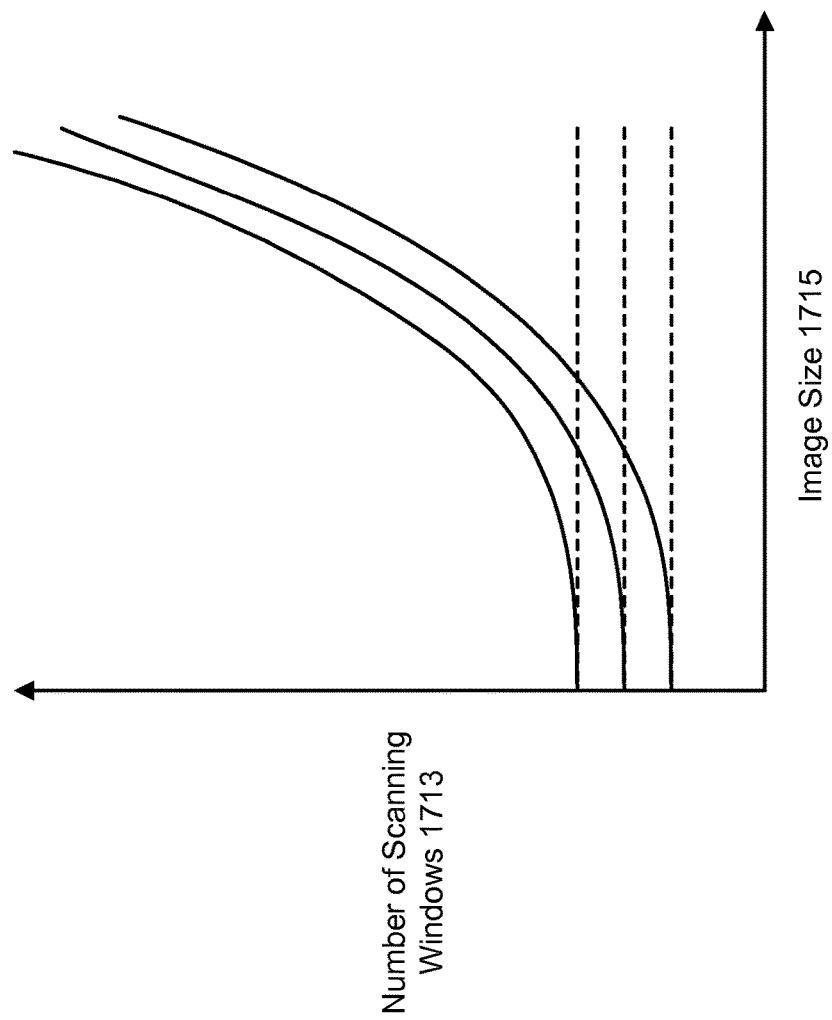

SYSTEMS AND METHODS FOR IMAGE SCANNING

CROSS-REFERENCE TO RELATED APPLICATION

This application is related to and claims priority to U.S. Provisional Patent Application Ser. No. 62/042,161, filed Aug. 26, 2014, for "SYSTEMS AND METHODS FOR IMAGE SCANNING," the entire contents of which are incorporated herein by reference.

FIELD OF DISCLOSURE

The present disclosure relates generally to electronic devices. More specifically, the present disclosure relates to systems and methods for image scanning.

BACKGROUND

In the last several decades, the use of electronic devices has become common. In particular, advances in electronic technology have reduced the cost of increasingly complex and useful electronic devices. Cost reduction and consumer demand have proliferated the use of electronic devices such that they are practically ubiquitous in modern society. As the use of electronic devices has expanded, so has the demand for new and improved features of electronic devices. More specifically, electronic devices that perform new functions and/or that perform functions faster, more efficiently or with higher quality are often sought after.

Some electronic devices (e.g., cameras, video camcorders, digital cameras, cellular phones, smart phones, computers, televisions, etc.) capture and/or utilize images. For example, a smartphone may capture and/or process still and/or video images. Processing images may demand a relatively large amount of time, memory and energy resources. The resources demanded may vary in accordance with the complexity of the processing.

It may be difficult to implement some complex processing tasks depending on the platform. For example, mobile platforms (e.g., mobile devices such as smartphones, tablets, laptop computers, etc.) may have limited processing, memory and/or energy resources (e.g., limited battery life). As can be observed from this discussion, systems and methods that improve image processing may be beneficial.

SUMMARY

A method for image scanning by an electronic device is described. The method includes obtaining an image pyramid comprising a plurality of scale levels and at least a first pyramid level for a frame. The method also includes providing a scanning window. The method further includes scanning at least two of the plurality of scale levels of the frame at a plurality of scanning window locations. A number of scanning window locations is equal for each scale level of the at least two scale levels of the first pyramid level. The method may include detecting an object based on the scanning. Computation by the electronic device for each of the at least two scale levels of the frame may be characterized by the number of scanning window locations multiplied by a number of pyramid levels.

The method may include determining a scanning step for each of the at least two scale levels. The method may also include scanning the at least two scale levels of a subsequent frame, wherein a quantity of the subsequent frames to scan all of the scanning window locations is greater at a lower scale level in comparison to a higher scale level.

The method may include selecting a range of scale levels for scanning the frame among the plurality of scale levels. Only scale levels within the range of scale levels may be scanned. The method may also include selecting a second range of scale levels among a plurality of scale levels of a subsequent frame for scanning the subsequent frame, wherein adjacent or non-adjacent scale levels are scanned.

The method may include determining a scanning step for each of the at least two scale levels. A first dimension scanning step may be proportional to a first dimension of an image at the first pyramid level for each of the scale levels scanned and a second dimension scanning step may be proportional to a second dimension of the image at the first pyramid level for each of the scale levels scanned.

A first dimension scanning step of one or more additional pyramid levels at a scale level may be equal to a first dimension scanning step corresponding to an image at the first pyramid level of the scale level. A second dimension scanning step for the one or more additional pyramid levels at the scale level may be equal to a second dimension scanning step corresponding to the image at the first pyramid level of the scale level.

The number of scanning window locations corresponding to each of one or more additional pyramid levels of a scale level may be less than or equal to the number of scanning window locations corresponding to the first pyramid level of the scale level. The plurality of scale levels may be octave levels.

An electronic device for image scanning is also described. The electronic device includes a processor and memory in electronic communication with the processor. The electronic device also includes instructions stored in memory. The instructions are executable to obtain an image pyramid comprising a plurality of scale levels and at least a first pyramid level for a frame. The instructions are also executable to provide a scanning window. The instructions are further executable to scan at least two of the plurality of scale levels of the frame at a plurality of scanning window locations. A number of scanning window locations is equal at each scale level of the at least two scale levels of the first pyramid level.

An apparatus for image scanning is also described. The apparatus includes means for obtaining an image pyramid comprising a plurality of scale levels and at least a first pyramid level for a frame. The apparatus also includes means for providing a scanning window. The apparatus further includes means for scanning at least two of the plurality of scale levels of the frame at a plurality of scanning window locations. A number of scanning window locations is equal for each scale level of the at least two scale levels of the first pyramid level.

A computer-program product for image scanning is also described. The computer-program product includes a non-transitory computer-readable medium with instructions. The instructions include code for causing an electronic device to obtain an image pyramid comprising a plurality of scale levels and at least a first pyramid level for a frame. The instructions also include code for causing the electronic device to provide a scanning window. The instructions further include code for causing the electronic device to scan at least two of the plurality of scale levels of the frame at a plurality of scanning window locations. A number of scanning window locations is equal for each scale level of the at least two scale levels of the first pyramid level.

BRIEF DESCRIPTION OF THE DRAWINGS

FIG. 16 is a diagram that illustrates one example of image scanning in accordance with some configurations of the systems and methods disclosed herein;

FIG. 17A is a graph that illustrates a number of scanning windows versus image size in accordance with some configurations of the systems and methods disclosed herein;

DETAILED DESCRIPTION

Tracking an object within an image or a user defined region of interest within that image using a camera from a mobile platform (e.g., tablets, phones) may be difficult. Real-time performance (~30 frames per second (fps)) may be required. Some configurations may combine the output of an optical flow-based tracker and an image content-based detector to obtain robust tracking. However, the computation of the existing algorithms may be prohibitive for mobile platforms to achieve real-time performance.

The present systems and methods may implement one or more of the following techniques to improve the speed of the tracking and detection algorithms: (1) using a fraction of possible detection (e.g., scanning) windows at each frame, (e.g. randomly select the window positions or utilize a scanning pattern); (2) selecting only a limited range of spatial scales (e.g., only a subset of available spatial scales) for object detection that are close in scale to a scale corresponding to a previous detected target size; (3) based on the confidence value of previous tracking, determining either to search for the object in a partial image or the entire image; (4) dynamically adjusting the number of the detection windows based on previous tracking results; (5) performing tracking and detection sequentially (e.g., applying the tracker first, since it is less computationally expensive); (6) running an object detector only when the confidence of the tracker is lower than a threshold; and (7) setting a number of scanning steps proportional to a total number of image locations. One of the advantages of the present methods and systems is to reduce computations used to track and/or detect a target object.

As used herein, the term "track" and its variants refer to a process that is motion-based, not identifying a specific object. For example, an object tracking and detection module may track motion from frame to frame and determine a location, size or frame of the target object based on movement of an electronic device (e.g., if the camera is panning) or movements of objects from frame to frame. The term "detect" and its variants refers to a process that attempts to identify a target object, e.g., by comparing a portion of a frame to a reference image. For example, an object tracking and detection module may compare portions of captured frames to a reference image (of the target object) in an attempt to identify a target object. In one example, detection may be used when a target can no longer be tracked (e.g., if an object falls outside the field of view). Systems and methods of performing motion-based tracking and object detection are explained in greater detail below.

Figure 1:
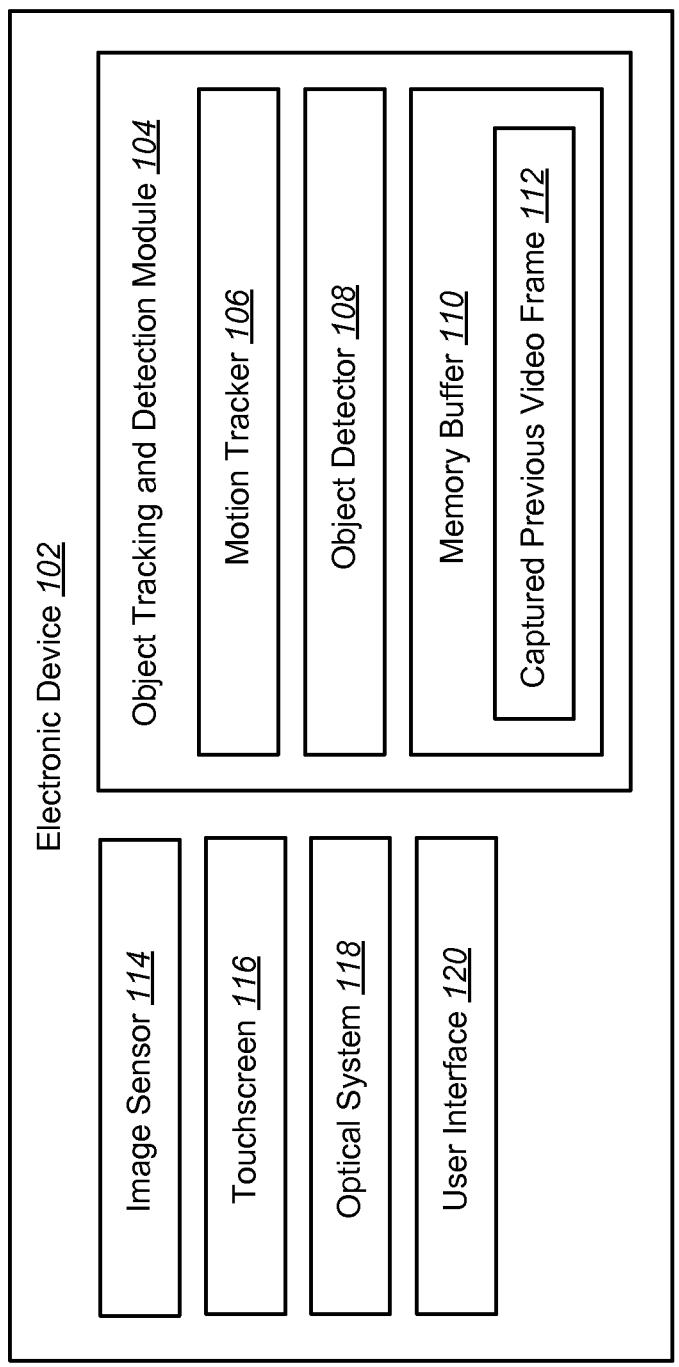
FIG. 1 is a block diagram illustrating an electronic device for tracking and detecting a target object.

FIG. 1 is a block diagram illustrating an electronic device 102 for tracking and detecting a target object. The electronic device 102 may also be referred to as a wireless communication device, a mobile device, mobile station, subscriber station, client, client station, user equipment (UE), remote station, access terminal, mobile terminal, terminal, user terminal, subscriber unit, etc. Examples of electronic devices include laptop or desktop computers, cellular phones, smart phones, wireless modems, e-readers, tablet devices, gaming systems, robots, aircraft, unmanned aerial vehicles (UAVs), automobiles, etc. Some of these devices may operate in accordance with one or more industry standards.

An electronic device 102, such as a smartphone or tablet computer, for example, may include a camera. The camera may include an image sensor 114 and an optical system 118 (e.g., lenses) that focuses images of objects that are located within the field of view of the optical system 118 onto the image sensor 114. An electronic device 102 may also include a camera software application and a display screen. When the camera application is running, images of objects that are located within the field of view of the optical system 118 may be recorded by the image sensor 114. The images that are being recorded by the image sensor 114 may be displayed on the display screen. These images may be displayed in rapid succession at a relatively high frame rate so that, at any given moment in time, the objects that are located within the field of view of the optical system 118 are displayed on the display screen. Although the present systems and methods are described in terms of captured video frames, the techniques discussed herein may be used on any digital image. Therefore, the terms video frame and digital image may be used interchangeably herein.

A user interface 120 of the camera application may permit one or more objects that are being displayed on the display screen to be tracked. The user of the electronic device may be permitted to select the object(s) that is/are to be tracked. Further, the selected object(s) may be used as a reference for later detecting the object. Additionally or alternatively, the object to be tracked (e.g., face, eye, person, shape, box, etc.) may be predetermined and/or may conform to a model.

In one configuration, the display is a touchscreen 116 that receives input from physical touch, e.g., by a finger, stylus or other tool. The touchscreen 116 may receive touch input defining a target object to be tracked. For example, if the electronic device 102 is capturing a nature scene that includes an animal of interest, a user may draw a bounding box around the animal indicating a desire that the animal be tracked, or detected, if necessary. Target objects may be selected in any suitable way. For example, facial recognition, pedestrian recognition, etc., may be used to select a target object that is to be tracked, detected, or both. In one configuration, multiple objects may be tracked. A user interface 120 may allow a user to interact with an object tracking and detection module 104, e.g., to select (i.e., define) one or more target objects.

The electronic device 102 may include an object tracking and detection module 104 for tracking a selected object and/or detecting the object in a video frame. The object tracking and detection module 104 may include a motion tracker 106 for tracking one or more objects. The motion tracker 106 may be motion-based for tracking motion of points on an image (e.g., a video frame) from frame to frame to estimate the location and/or change of location of a target object between a previous video frame and a current video frame.

The object tracking and detection module 104 may also include an object detector 108 for detecting an object on a video frame. The object detector 108 may use an object model, rather than a motion-based model, to detect an object by comparing all or a portion of a current video frame to a selected object or portion of a captured previous video frame 112 (e.g., in a sequence of video frames). The object detector 108 may be used for detecting multiple objects within a video frame. In some configurations, the object detector 108 may scan one or more frames and/or images in order to detect a particular object. For example, the object detector 108 may scan one or more frames in accordance with the approaches described in connection with one or more of FIGS. 11-17.

The object tracking and detection module 104 may also include a memory buffer 110. The memory buffer 110 may store one or more captured frames and data associated with the captured video frames. In one example, the memory buffer 110 may store a previous captured video frame 112. The object tracking and detection module 104 may use data provided from the memory buffer 110 about a captured previous video frame 112 in performing motion-based tracking and/or object detection. Data may be provided to the motion tracker 106 or object detector 108 via feedback from the memory buffer 110 in order to tailor motion-based tracking and object detection to more accurately track and/or detect a target object. For example, the memory buffer 110 may provide location and window size data to the motion tracker 106 and the object detector 108 to provide the motion tracker 106 and object detector 108 one or more parameters that may be used to more accurately pinpoint a location and size of an object when tracking or detecting the object.

As stated above, the electronic device 102 may perform motion-based tracking. Motion-based tracking may be performed using a variety of methods. In one example, tracking is performed by a median flow method in which the motion tracker accepts a pair of images $I_t$, $I_{t+1}$ (e.g., video frames) and bounding box $\beta_t$ and outputs a bounding box $\beta_{t+1}$. A set of points may be initialized on a rectangular grid within the bounding box $\beta_t$ and tracks the points to generate a sparse motion flow between $I_t$ and $I_{t+1}$. A quality of the point prediction may be estimated and each point assigned an error. A portion (e.g., 50%) of the worst predictions may be filtered out while the remaining predictions are used to estimate the displacement of the whole bounding box. The motion tracker 106 may perform motion-based tracking on each video frame captured by an electronic device 102. In a similar method, motion-based tracking may be performed by calculating one or more gradients (e.g., x and y gradients) and using the difference between a pair of frames to calculate a time gradient and using the multiple gradient values to accurately track a target object within a current video frame. Further details regarding motion-based tracking are provided below.

When performing motion-based tracking, the motion tracker 106 may determine a tracking confidence value based on a calculated or estimated accuracy of the motion-tracking method. In some configurations, the tracking confidence value may be a real number between 0 and 1 corresponding to a likelihood or probability that a target object falls within a current video frame or a defined window of the video frame. The tracking confidence value may be compared to a tracking threshold. If the tracking confidence value is greater than the tracking threshold, the likelihood may be high that the target object is found within the current video frame. Alternatively, if the tracking confidence value is less than or equal to a tracking threshold, the likelihood may be low or uncertain whether the target object is found within the current video frame. Various methods for determining a tracking confidence value may be used. In one configuration, the tracking confidence value is determined by calculating a normalized cross correlation (NCC) between a tracked window (e.g., a tracking patch window) in a current video frame and previously stored image patches from previously captured video frames. Further details regarding determining a tracking confidence value are provided below.

The electronic device 102 may also perform object detection. Object detection may be performed using a variety of methods. In one configuration, object detection is performed using a sliding window method in which the content of multiple subsets of windows within a video frame are viewed to determine whether a target object is found in a current video frame or within a particular window or subset of windows of the current video frame. Additionally or alternatively, a scanning step approach may be utilized, where one or possibly more scanning windows in a frame or image may be skipped. Accordingly, all or a subset of all possible window locations and sizes may be searched in a video frame. For example, each window may correspond to pixels of data and the object detector 108 may perform one or more computations using the pixels of data to determine a level of confidence (e.g., a binary indicator) that the target object is within a particular window or subwindow. Based on the level of confidence associated with one or more windows, a detector confidence value may be obtained for a current video frame. Further, additional techniques may be used for increasing the accuracy or efficiency of the object detection. Some of these techniques are explained below.

In some configurations, the motion tracker 106 and object detector 108 may operate sequentially rather than in parallel. For example, the electronic device 102 may perform motion-based tracking of a selected object (e.g., target object) and sequentially perform object detection of the selected object based on a tracked parameter. In one configuration, the electronic device 102 may perform motion-based tracking on a current video frame. The electronic device 102 may then perform object detection on the current frame based on a tracked parameter. In one configuration, the tracked parameter may be based on a comparison between a confidence value and a threshold. For example, if a tracking confidence value is below a tracking threshold, the electronic device 102 may perform object detection. Alternatively, if a tracking confidence value is above a tracking threshold, the electronic device 102 may skip object detection for a current video frame and continue performing motion-based tracking on a next video frame based on the motion tracking results of the current video frame. In other words, object detection may be performed only when the motion-based tracking is not very good, e.g., the tracking confidence value is below a tracking threshold. Other tracked parameters may be used when considering whether and/or how object detection is performed. Examples of tracked parameters may include a region of a target object, a window location, a window size, a scale level, a target size, a tracking and/or detection confidence value or other parameter that may be used to facilitate efficient tracking and/or detection of a target object.

Sequentially performing motion-based tracking and object detection based on a tracked parameter may enable the electronic device 102 to track and/or detect a target object within a video frame without performing extensive computations. Specifically, because motion-based tracking may be less computationally intensive than object detection, an electronic device 102 may skip performing object detection where motion-based tracking may be used to accurately track a target object within a current video frame. For example, if an electronic device 102 determines that a tracking confidence value exceeds a specific target threshold, the electronic device 102 may determine that object detection is not needed on a current video frame to accurately determine the location or presence of a target object within the current video frame. Further, because object detection may be beneficial in many cases, the electronic device 102 may determine cases in which object detection may be used to more accurately detect a target object or to perform object detection in cases where motion-based tracking is inadequate based on a comparison to a tracking threshold value.

In some configurations, rather than skipping object detection on a current video frame, the results of the motion-based tracking and/or additional information provided by the memory buffer 110 may be used to narrow or tailor the process of performing object detection. For example, where a target object cannot be accurately tracked using a motion-based tracking method, the electronic device 102 may still estimate or obtain information about the location, window scale or other tracked parameter associated with a target object that may be used during object detection to more accurately detect an object using less computational power than without the parameters provided via motion-based tracking. Therefore, even in cases where the motion-based tracking does not provide a tracking confidence value exceeding a tracking threshold, the results of the motion-based tracking may be used when subsequently performing object detection.

Figure 2:
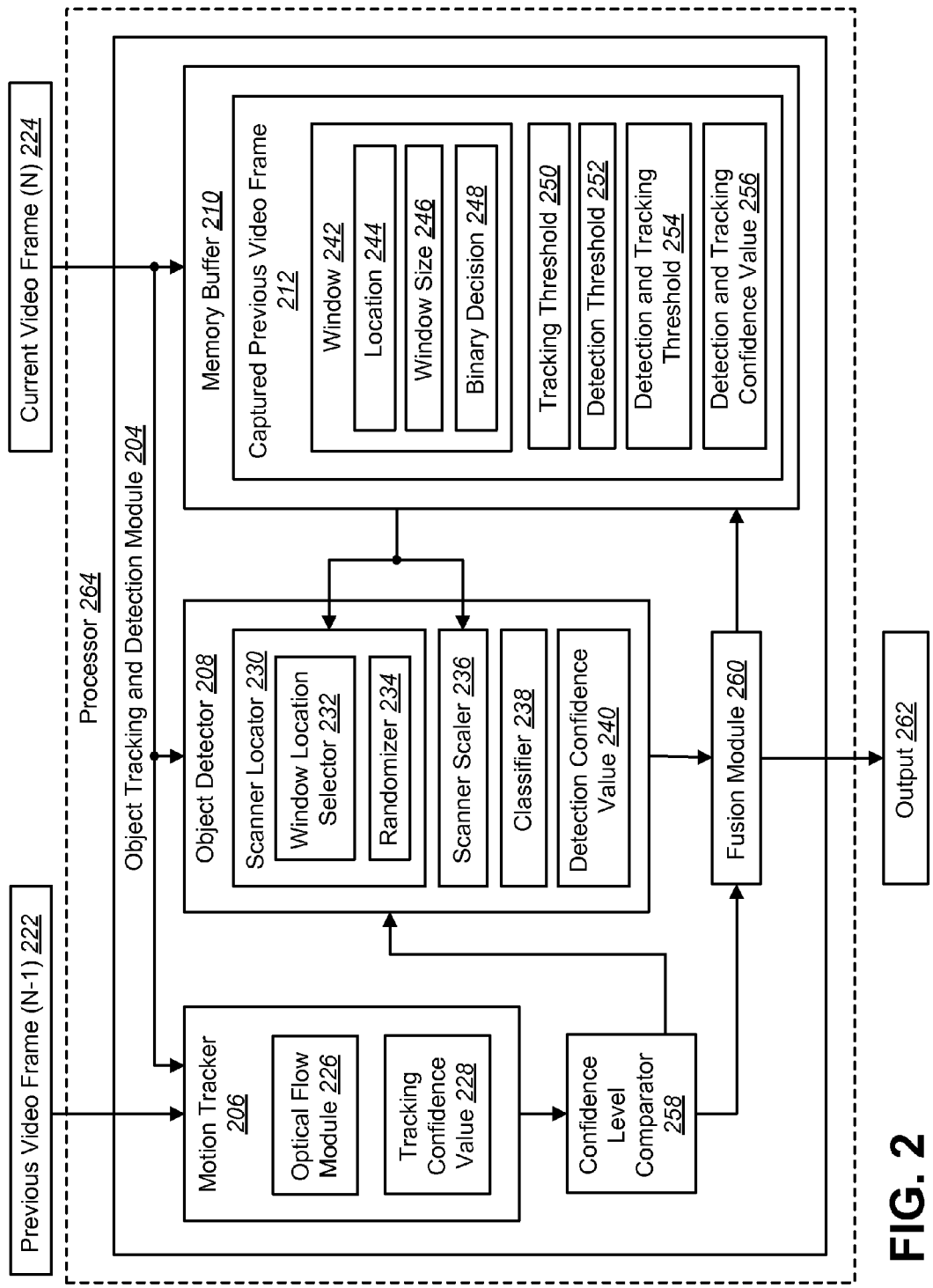
FIG. 2 is a block diagram illustrating an object tracking and detection module.

FIG. 2 is a block diagram illustrating an object tracking and detection module 204. The object tracking and detection module 204 may be implemented within an electronic or wireless device. The object tracking and detection module 204 may include a motion tracker 206 having an optical flow module 226 and a tracking confidence value 228. The object tracking and detection module 204 may also include an object detector 208 having a scanner locator 230, scanner scaler 236, classifier 238 and a detection confidence value 240. The memory buffer 210 may store data associated with a captured previous video frame 212 that may be provided to the motion tracker 206 and object detector 208. The object tracking and detection module 204, motion tracker 206, object detector 208 and memory buffer 210 may be configurations of the object tracking and detection module 104, motion tracker 106, object detector 108 and memory buffer 110 described above in connection with FIG. 1.

The motion tracker 206 may be used to perform motion-based tracking on a current video frame (N) 224. For example, a previous video frame (N−1) 222 and a current video frame (N) 224 may be received (e.g., by the electronic device). The previous video frame (N−1) 222 may immediately precede a current video frame (N) 224 in a sequence of video frames. Additional video frames may be obtained and processed by the object tracking and detection module 204. The previous video frame (N−1) 222 may be provided to a motion tracker 206. Further, the memory buffer 210 may store data associated with the previous video frame (N−1) 222, referred to herein as a captured previous video frame 212. In some configurations, the memory buffer 210 may obtain information about the previous video frame (N−1) 222 directly from the electronic device (e.g., from the camera). The memory buffer 210 may also obtain tracking results about the previous video frame (N−1) 222 from the fusion module 260 which may specify where an object was tracked and/or detected in the previous video frame (N−1) 222. This information about the previous video frame (N−1) 222 or other previously captured video frames may be stored in the memory buffer 210.

The motion tracker 206 may subsequently receive a current video frame (N) 224 in a sequence of video frames. The motion tracker 206 may compare the current video frame (N) 224 to the previous video frame (N−1) 222 (e.g., using information provided from the memory buffer 210). The motion tracker 206 may track motion of an object on the current video frame (N) 224 using an optical flow module 226. The optical flow module 226 may include hardware and/or software for performing motion-based tracking of an object on a current video frame (N) 224. By comparing the previous video frame (N−1) 222 and the current video frame (N) 224, the motion tracker 206 may determine a tracking confidence value 228 associated with the likelihood that a target object is in the current video frame (N) 224. In one example, the tracking confidence value is a real number (e.g., between 0 and 1) based on a percentage of certainty that the target object is within the current video frame (N) 224 or a window within the current video frame (N) 224.

The object detector 208 may be used to detect an object on a current video frame (N) 224. For example, the object detector 208 may receive a current video frame (N) 224 in a sequence of video frames. The object detector 208 may perform object detection on the current video frame (N) 224 based on a tracked parameter. The tracked parameter may include a tracking confidence value 228 corresponding to a likelihood that a target object is being accurately tracked. More specifically, a tracked parameter may include a comparison of the tracking confidence value 228 to a tracking threshold 250. The tracked parameter may also include information provided from the memory buffer 210. Some examples of tracked parameters that may be used when detecting an object include a region, a window location, a window size, or other information that may be used by the object detector 208 as a parameter when performing object detection.

The object detector 208 may include a scanner locator 230. The scanner locator 230 may include a window location selector 232 and/or a randomizer 234. The window location selector 232 may select multiple windows within a video frame. For example, a video frame may include multiple windows (e.g., scanning windows), each with an associated location and size. In one configuration, each video frame is divided into multiple (e.g., approximately 10,000) overlapping windows, each including a fraction of the total pixels in the video frame. Alternatively, there may be any suitable number of windows and they may or may not overlap. In some configurations, the window location selector 232 may select a number of scanning windows, where the number of scanning windows is equal for each image scale (e.g., scale level) at one or more pyramid levels. Additionally or alternatively, the selected scanning windows may follow a particular scanning pattern (e.g., sliding window, scanning step, etc.). For example, the scanning windows may follow a scanning step pattern as described in connection with one or more of FIGS. 12, 14 and 16. The window location selector 232 within the scanner locator 230 may select the location of a window in which to attempt to identify a target object.

The randomizer 234 may randomly select windows of varying sizes and locations for detecting an object. In some configurations, the randomizer 234 randomly selects windows within a video frame. Alternatively, the randomizer 234 may more precisely select windows based on one or more factors. For example, the randomizer 234 may limit the selection of windows based on a region, size or general location of where an object is most likely located. This information may be obtained via the memory buffer 210 or may be obtained via the motion-based tracking that, while not accurate enough to be relied on entirely, may provide information that is helpful when performing object detection. Therefore, while the randomizer 234 may randomly select multiple windows to search, the selection of windows may be narrowed, and therefore not completely random, based on information provided to the object detector 208. It should be noted that the randomizer 234 may be optional and/or may not be included in the object detector 208 in some configurations.

The object detector 208 may also include a scanner scaler 236, which may be used to draw or select a window of a certain size. The window size may be used by the scanner locator 230 to narrow the sizes of windows when detecting an object or comparing a selection of windows to an original image to detect whether an image is within a specific window. The scanner scaler 236 may select one or more windows of certain sizes initially when defining an object or, alternatively, draw one or more windows of certain sizes based on information provided from the memory buffer 210. Additionally or alternatively, the scanner scaler 236 may scale an image to one or more different sizes. For example, the scanner scaler 236 may generate an image pyramid in some configurations, where each image in the image pyramid may be a particular scale of a base image (e.g., frame). In some configurations, for instance, only a single scanning window size may be utilized, while the image (e.g., frame) may be scaled to different sizes. More detail is given in connection with FIGS. 11-16.

The classifier 238 may be used to determine whether some or all of a target object is found in a specific window. In some configurations, the classifier 238 may produce a binary value for each window to indicate whether a target object is detected within a specific window or subwindow. This classification (e.g., binary classification) may be performed for each window searched by the object detector 208. Specifically, the classifier 238 may generate a binary 1 for each window in which the object is detected and a binary 0 for each window in which the object is not detected. Based on the number or a combination of 1s and 0s, the object detector 208 may determine a detection confidence value 240 indicating a likelihood that the target object is present within a current video frame (N) 224. In some configurations, the detection confidence value 240 is a real number between 0 and 1 indicating a percentage or probability that an object has been accurately detected.

The object detector 208 may perform object detection according to a variety of tracked parameters, including a region, target size, window size, scale level, window location and/or one or more confidence values. Once the windows of a video frame or a subset of windows are searched and the object detector 208 obtains a binary value for each searched window, the object detector 208 may determine window size as well as a location or region on the current video frame that has the highest confidence. This location and window size may be used in subsequent tracking and detecting to more accurately track and/or detect a target object.

As stated above, various methods may be used by the object detector 208 in detecting a target object. In one configuration, detecting a target object may include performing a binary classification for windows at every possible window location and every possible window size. However, searching every possible window is resource intensive. Thus, in another configuration, the object detector may search a subset of window locations and sizes, rather than all possible windows in a video frame. For example, the object detector 208 may search 1% of all possible windows. Then, if detection is unsuccessful (e.g., the detection confidence value 240 is less than a detection threshold 252), a higher percentage of window locations may be searched in a subsequent captured frame, e.g., 2%. The step in percentage of window locations searched may be uniform, non-uniform, slow or fast, i.e., consecutive frames may have 1%, 2%, 3%, 4% or 1%, 2%, 4%, 8%. In one configuration, the percentage of searched frames may be set very high (e.g., 80%, 90%, 100%) in response to a high detection confidence value, i.e., to ensure that the target object is in a next video frame. For example, the percentage of searched frames may jump to at least 80% in response to a detection and tracking confidence value that exceeds a detection and tracking threshold value. Alternatively, the percentage may jump to 60%, 70%, 90%, etc. Additionally, any suitable value for the detection and tracking threshold value may be used, e.g., 0.6, 0.65, 0.7, 0.75, 0.8, 0.85, etc. Furthermore, the percentage of windows searched may be determined randomly, based on a randomizer (random number generator), e.g., a random percentage of windows between 1% and 15% may be searched in a captured frame. By searching a subset of all the window locations, the object detection may use fewer resources in the electronic device.

Furthermore, the present systems and methods may search a subset of window sizes for each location. Each window size may have particular dimensions and/or include a certain number of pixels. For example, there may be 20 possible window sizes. In some configurations, rather than searching all 20 window sizes, a subset of window sizes may be searched at each window location. Alternatively, a single window size may be utilized for scanning one or more images. For example, one window size may be utilized to scan an image (e.g., frame) that is scaled to different sizes (e.g., scales, scale levels, pyramid levels, etc.). The systems and methods disclosed herein may be applied in either approach.

The present systems and methods may also use feedback from the memory buffer 210 to tailor the window locations and/or sizes searched. In other words, the location and size of the last captured video frame in which the target object was successfully detected and/or tracked may be used as a starting point for searching a current video frame (N) 224. For example, if the target object was detected and tracked in a recent video frame (i.e., the detection and tracking confidence value 256 for a recent captured video frame is above a detection and tracking threshold), the scanner locator may start searching a current captured frame at the location and size associated with the recent frame. For example, where a target object moves out of the field of view of an optical system or disappears at a distance, the target object may be more likely to reappear at the same size as when the target object left the field of view of the optical system or disappeared at a distance. Thus, a size or range of sizes may be predicted for detecting the target object in subsequent video frames when performing object detection.

Furthermore, the search range of window locations and window sizes searched in the captured video frame (N) 224 may be limited to those similar to the window location and window size associated with the target object in a recent video frame (e.g., the previous video frame (N−1) 222). As used herein, the term "search range" refers to the set of candidate window locations, candidate window sizes and/or candidate image scales (e.g., scale levels) that may be utilized when detecting and/or tracking a target object in a video frame. For example, the subset of the window locations searched may be selected from within a portion of the current video frame (N) 224 based on where the target object was found in a recent video frame, e.g., one of the quadrants or halves of the current video frame (N) 224. In other words, the search space may be limited to nearby where the target object was last tracked or detected. Similarly, the scales of the images (and/or sizes of frames) searched for each window location may be limited based on the scale of the image (and/or size of the window) in which the targeted object was found in a recent video frame. For example, if the object was detected in a recent frame using a scale level of 8, the scanner scaler 236 may select only image scale levels for the current video frame (N) 224 of 8, plus or minus 1, i.e., scale levels 7-9. This may further eliminate low probability searching and increase the efficiency of object detection. Alternatively, if a recent (non-current) video frame did not detect the target object (i.e., the detection and tracking confidence value 256 for the recent video frame is below a detection and tracking threshold), the object detector 208 may expand the search space (e.g., image scales and/or window locations) that is searched, e.g., a wider range of an image or the whole image may be subject to search.

The object tracking and detection module 204 may include a fusion module 260 to merge multiple windows to form a single window. There are initially two confidence values: a detection confidence value 240 from the object detector 208 and a tracking confidence value 228 from the motion tracker 206. The fusion module 260 may compare and/or combine the two confidence values (e.g., pick the one that is larger) into a detection and tracking confidence value 256. The detection and tracking confidence value 256 may indicate whether the target object was identified on a video frame. In one configuration, the detection and tracking confidence value 256 may be a real number between 0 and 1, where 0 indicates the lowest possible confidence that the target object was identified in a particular video frame and 1 indicates the highest possible confidence that the target object was identified in a particular video frame. In other words, the detection and tracking confidence value 256 may serve as an overall indication of the likelihood that a target object was found. Further, the detection and tracking confidence value 256 may be a parameter used for determining image scale, window location, window size or percentage of windows to search in a next video frame. The fusion module 260 may be used to provide information about a current video frame (N) 224 to the memory buffer 210. In one example, the fusion module 260 may provide information about the tracked window 242 (e.g., window location 244, window size 246, etc.) and a detection and tracking confidence value 256 to the memory buffer 210. The fusion module 260 may use the tracking results (e.g., bounding boxes) from the motion tracker 206 and object detector 208 to form a combined tracking result (e.g., bounding box) and calculate the detection and tracking confidence value 256.

The memory buffer 210 may store one or more values associated with the previous video frame (N−1) 222, the current video frame (N) 224 or other captured video frames. In one configuration, the memory buffer 210 stores a captured previous video frame 212, which may include information corresponding to the previous video frame (N−1) 222. The captured previous video frame 212 may include information about one or more windows 242, including the location 244, window size 246 and a binary decision 248 (e.g., from the classifier 238) for each window 242. Additionally or alternatively, the captured previous video frame 212 may include information about the image scale (e.g., scale level) in which the object what last detected and/or tracked. The captured previous video frame 212 may also include a tracking threshold 250, detection threshold 252 and a detection and tracking threshold 254. The tracking threshold 250 may be provided to the motion tracker 206 or circuitry on the object tracking and detection module (e.g., confidence level comparator 258) to determine whether the tracking confidence level is greater than the tracking threshold 250. The detection threshold 252 may be provided to the object detector 208 or other circuitry on the object tracking and detection module 204 to determine whether the detection confidence value 240 is greater than the detection threshold 252. The detection and tracking threshold 254 may be a combined value based on the tracking threshold 250 and the detection threshold 252. The detection and tracking threshold 254 may be compared to a detection and tracking confidence value 256 to determine a combined confidence value for the motion-based tracking and the object detection. Each of the thresholds may be based on a likelihood that a target object is located within a video frame. The object tracking and detection module 204 may perform motion-based tracking and/or detection on a current video frame (N) 224 until a specific detection and tracking confidence value 256 is obtained. Further, the motion-based tracking and object detection may be performed on each video frame in a sequence of multiple video frames.

Performing motion-based tracking and object detection may include sequentially performing motion-based tracking followed by object detection based on a tracked parameter. In particular, the present systems and methods may implement a two-step tracking and detection approach. Since motion-based tracking is based on relative motion of a scene, rather than actual object identification as used with object detection, the motion-based tracking may be less resource-intensive in an electronic device than performing object detection. Accordingly, it may be more efficient to use the motion tracker 206 instead of the object detector 208, where a target object may be accurately tracked without also performing object detection.

Therefore, rather than using the motion tracker 206 in parallel with the object detector 208, the object tracking and detection module 204 only uses the object detector 208 where the motion tracker 206 is insufficient, i.e., the motion tracking and object detection (if performed at all) are performed sequentially instead of in parallel. For each video frame on which tracking is performed, the motion tracker 206 may produce a tracking confidence value 228, which may be a real number between 0 and 1 indicating a likelihood that the target object is in a current video frame (N) 224.

In one configuration of the two-step tracking and detection approach, the motion tracker 206 may first perform motion-based tracking on a current video frame (N) 224. The motion tracker 206 may determine a tracking confidence value 228 based on the motion-based tracking process. Using the tracking confidence value 228 and a tracking threshold 250 provided by the memory buffer 210, circuitry within the object tracking and detection module 204 (e.g., a confidence level comparator 258) may determine whether the tracking confidence value 228 exceeds a tracking threshold 250. If the tracking confidence value 228 is greater than the tracking threshold 250, the object tracking and detection module 204 may skip performing object detection and provide the tracking result to a fusion module 260 to produce an output 262. The output 262 may include an indication that a target object is within a current video frame (N) 224. Further, the output 262 may include additional information about the target object.

If the tracking confidence value 228 does not exceed the tracking threshold 250, the object detector 208 may subsequently perform object detection on the current video frame (N) 224. The object detection may be performed on all or a subset of windows within the current video frame (N) 224. The object detector 208 may also select a subset of windows, window sizes or other detection criteria based on results of the motion-based tracking and/or information provided from the memory buffer 210. The object detection may be performed using a more or less robust process based on one or more tracked parameters provided to the object detector 208. The object detector 208 may determine a detection confidence value 240 and compare the detection confidence value 240 to a detection threshold 252. If the detection confidence value 240 is above a detection threshold 252, the object detector 208 may provide the detection result to the fusion module 260 to produce an output 262. The output may include an indication that a target object is within a current video frame (N) 224 and/or include additional information about the detected object.

Alternatively, if the detection confidence value 240 is less than or equal to a detection threshold 252, the object detector 208 may perform object detection again using a more robust method, such as searching a greater number of windows within the current video frame (N) 224. The object detector 208 may repeat the process of object detection until a satisfactory detection confidence value 240 is obtained. Once a satisfactory detection confidence value 240 is obtained such that a target object within the current video frame is identified, the object tracking and detection module 204 may be used to perform tracking and detection on a next video frame.

As illustrated in FIG. 2, one or more of the illustrated components may be optionally implemented by a processor 264. For example, the object tracking and detection module 204 may be implemented by a processor 264. In some configurations, different processors may be used to implement different components (e.g., one processor may implement the motion tracker 206, another processor may be used to implement the object detector 208 and yet another processor may be used to implement the memory buffer 210).

Figure 3:
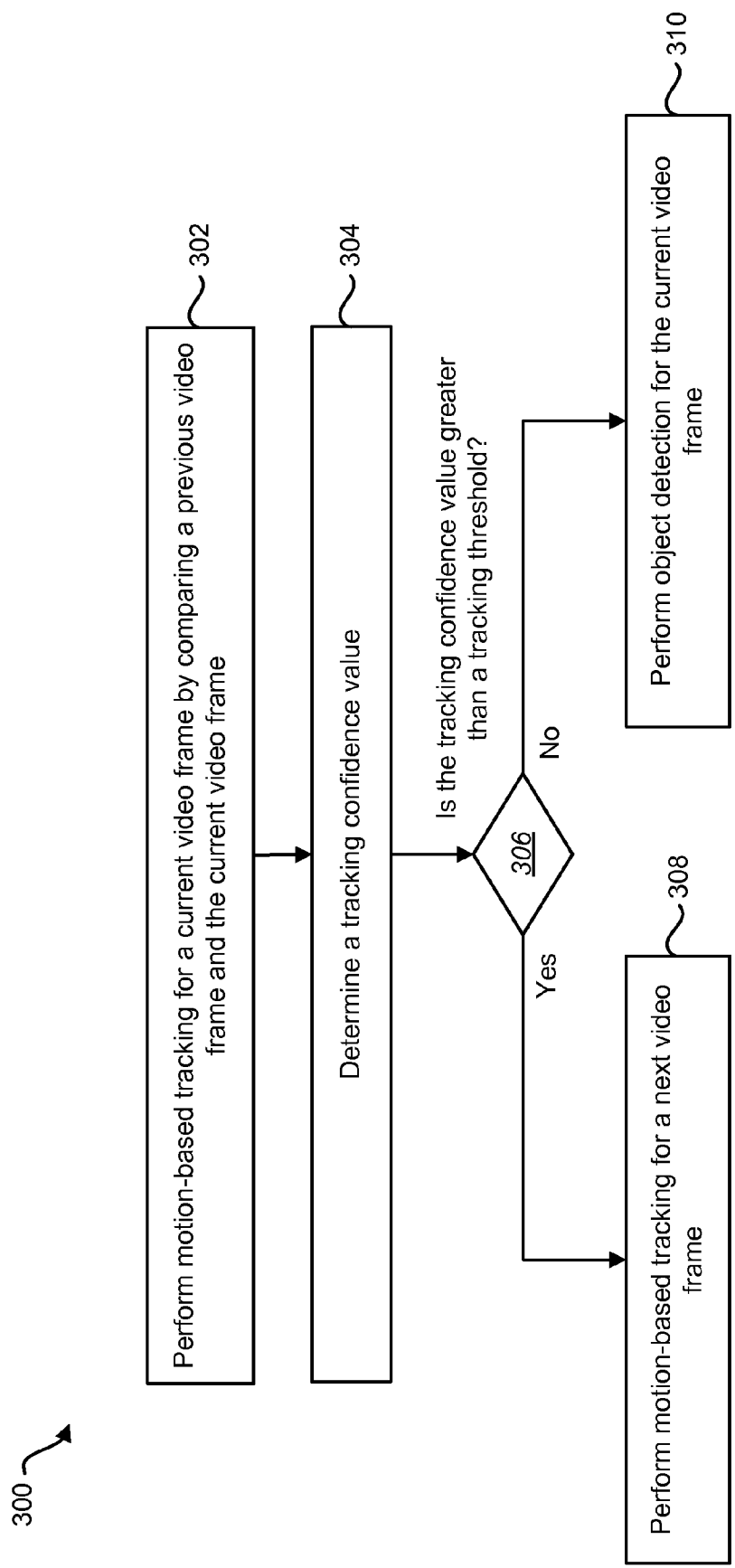
FIG. 3 is a flow diagram illustrating a method for performing motion-based tracking and object detection.

FIG. 3 is a flow diagram illustrating a method 300 for performing motion-based tracking and object detection. The method 300 may be implemented by an electronic device 102, e.g., an object tracking and detection module 104. The electronic device 102 may perform 302 motion-based tracking for a current video frame (N) 224 by comparing a previous video frame (N−1) 222 and the current video frame (N) 224. Tracking an object may be performed using a median flow method by tracking points between pairs of images. Other methods of motion-based tracking may also be used. Additionally, the motion-based tracking may be performed for a current video frame (N) 224 using information about a captured previous video frame 112 provided via a memory buffer 110.

The electronic device 102 may determine 304 a tracking confidence value 228. The tracking confidence value 228 may indicate a likelihood or certainty that a target object has been accurately tracked. The electronic device 102 may determine 306 whether the tracking confidence value 228 is greater than a tracking threshold 250. If the tracking confidence value 228 is greater than the tracking threshold 250, the electronic device 102 may perform 308 motion-based tracking for a next video frame. Further, the electronic device 102 may skip performing object detection on the current video frame based on the result of the motion-based tracking. In other words, object detection may be performed for the current video frame only when the motion tracking is not very good, i.e., if the tracking confidence value is not greater than a tracking threshold. If, however, the tracking confidence value 228 is not greater than the tracking threshold 250, the electronic device 102 may perform 310 object detection for the current video frame (N) 224. Additionally or alternatively, object detection may be performed on the next video frame. For example, if the tracking confidence value 228 is not greater than the tracking threshold, object detection may be performed on the next video frame (instead of object detection on the current video frame 224, for instance). The electronic device 102 may perform the object detection in sequence to the motion-based tracking. In some configurations, the object detection may be performed multiple times with varying robustness to obtain a higher detection confidence value 240.

Figure 4:
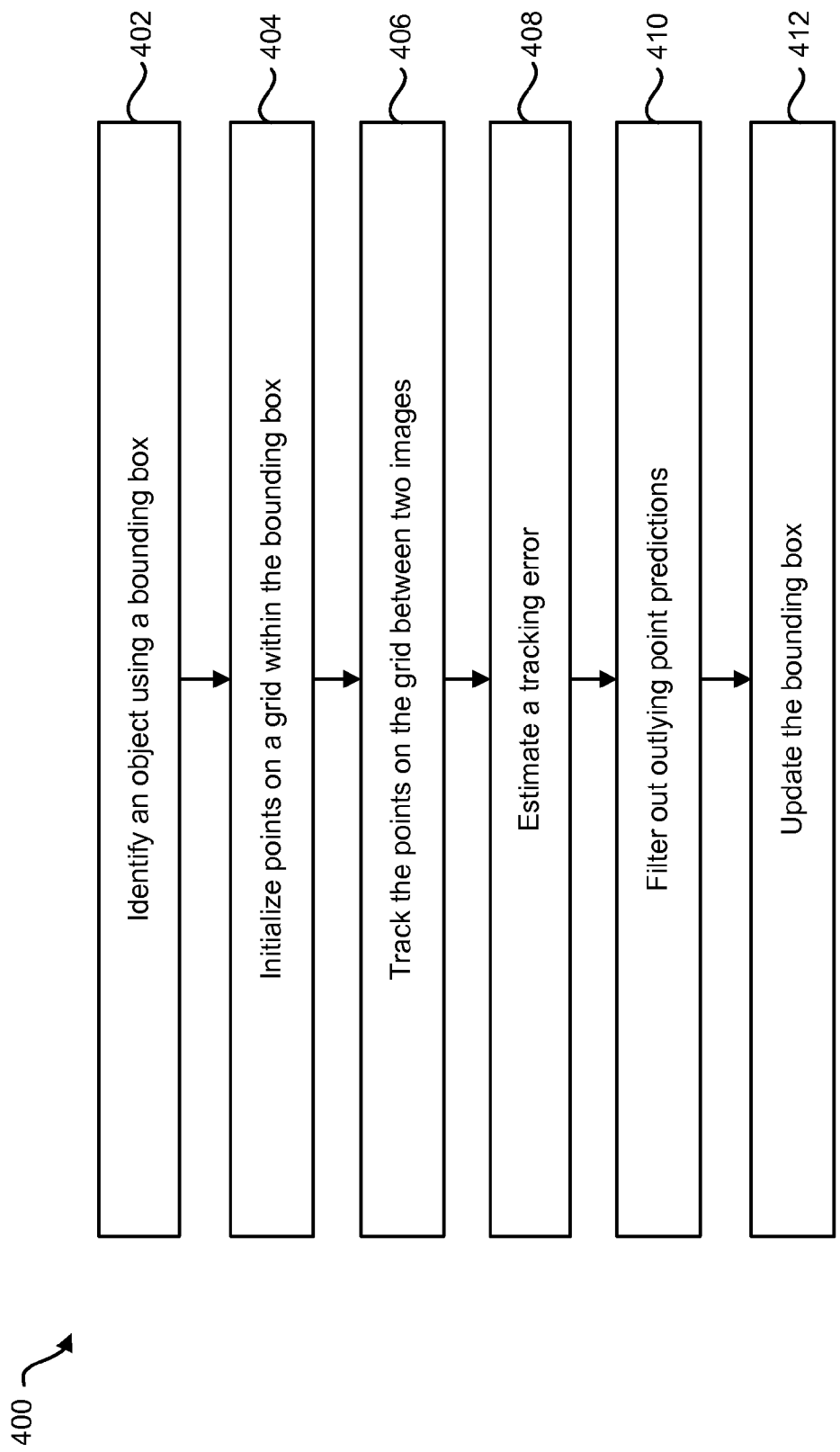
FIG. 4 is a flow diagram illustrating a method for performing motion-based tracking.

FIG. 4 is a flow diagram illustrating a method 400 for performing motion-based tracking. The method 400 may be implemented by an electronic device 102, e.g., an object tracking and detection module 104. The electronic device 102 may identify 402 a target object using a bounding box. Identifying 402 an object may be performed manually using a touchscreen 116 or other input method in which an object of interest is selected. Multiple objects may be identified in a similar way. Further, other input methods may be used to identify an object to be tracked. In one example, an object is identified by manually drawing a bounding box around the target object.

The electronic device 102 may initialize 404 points on a grid within the bounding box. The points on the grid may be uniformly spaced throughout the bounding box. Further, the points may be tracked 406 on the grid between two images (e.g., previous video frame (N−1) 222 and current video frame (N) 224). In one example, the points are tracked by a Lucas-Kanade tracker that generates a sparse motion flow between images. The electronic device 102 may estimate 408 a tracking error between the two images (e.g., a previous video frame (N−1) 222 and a current video frame (N) 224). Estimating 408 a tracking error may include assigning each point of the tracked points an error value. Further, estimating 408 a tracking error may be performed using a variety of methods, including forward-backward error, normalized cross correlation (NCC) and sum-of-square differences, for example. The estimated tracking error may be used to obtain a tracking confidence value 228 and ultimately determining a likelihood that a target object is in a current video frame (N) 224. In one configuration, the tracking confidence value 228 may be obtained by calculating a normalized cross correlation (NCC) between a tracked window in a current video frame (N) 224 and a previous video frame (N−1) 222. The tracking error may also be estimated using additional techniques, including a forward-backward error estimation described in more detail below in connection with FIG. 5. Further, the electronic device 102 may filter 410 out outlying point predictions. For example, the electronic device may filter out 50% of the worst predictions. The remaining predictions may be used to estimate the displacement of the bounding box.

The electronic device 102 may update 412 the bounding box. Updating 412 the bounding box may be performed such that the updated bounding box becomes the new bounding box for the next video frame. The motion-based tracking process may then be repeated for a next video frame or, if a tracking confidence value is less than or equal to a tracking threshold 250, the motion-based tracking process may be discontinued for a next video frame until a target object may be accurately tracked. In some configurations, where the motion-based tracking for a current video frame (N) 224 does not provide a satisfactory result, the electronic device may perform object detection on the current video frame (N) 224 to obtain a higher level of confidence in locating a target object. In some configurations, where motion-based tracking cannot produce satisfactory results (e.g., when a target object moves out of range of a video frame), object detection may be performed on any subsequent video frames until a target object is detected.

Figure 5:
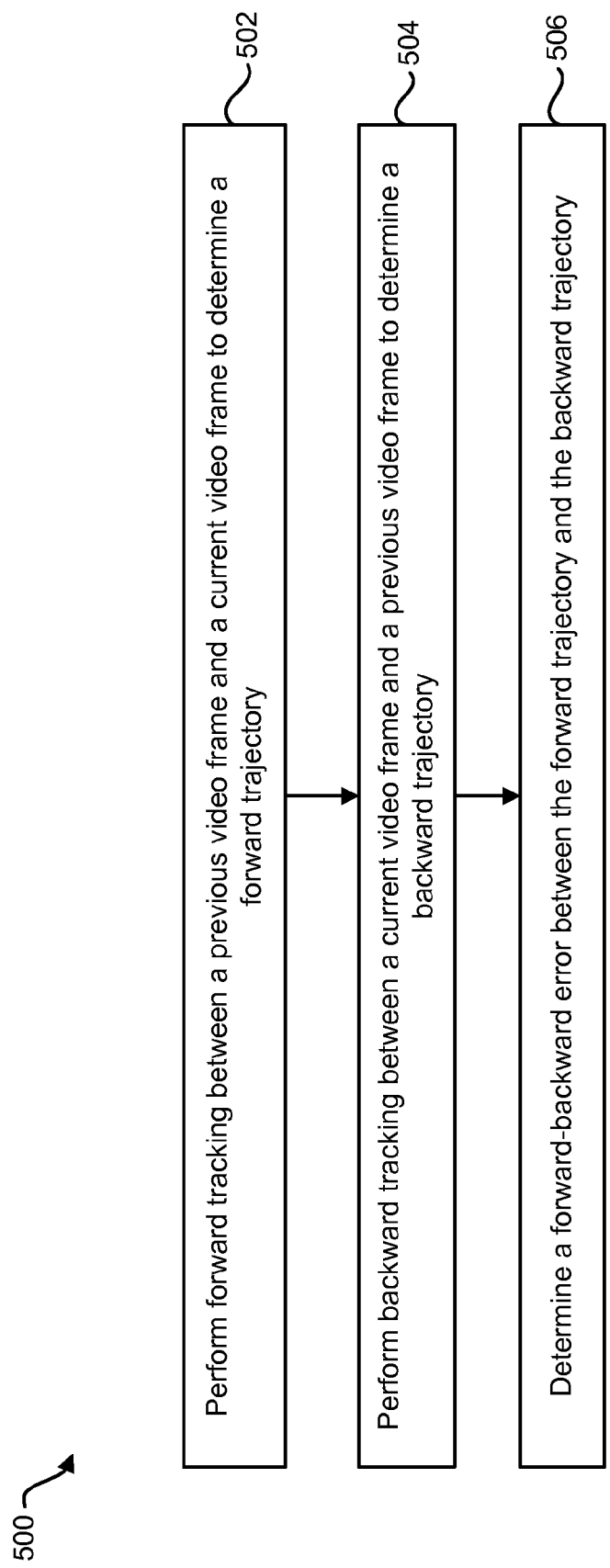
FIG. 5 is a flow diagram illustrating a method of estimating a tracking error in motion-based tracking based on forward-backward error.

FIG. 5 is a flow diagram illustrating a method 500 of estimating a tracking error in motion-based tracking based on forward-backward error. The method 500 may be implemented by an electronic device 102 (e.g., an object tracking and detection module 104). In some configurations, the electronic device 102 may calculate a normalized cross correlation (NCC) between tracked windows. The normalized cross correlation (NCC) may be used to determine a tracking confidence value 228. The electronic device 102 may also use various tracking error estimation techniques complementary to normalized cross correlation (NCC) (e.g., forward-backward error, sum-of-square difference). In an example using forward-backward error estimation, an electronic device 102 may perform 502 forward tracking between a previous video frame (N−1) 222 and a current video frame (N) 224 to determine a forward trajectory. Forward tracking may include tracking an image forward for k steps. The resulting forward trajectory may be equal to $(x_t, x_{t+1}, \ldots, x_{t+k})$, where $x_t$ is a point location in time and k indicates a length of a sequence of images. The electronic device 102 may perform 504 backward tracking between a current video frame (N) 224 and a previous video frame (N−1) 222 to determine a backward trajectory. The resulting backward trajectory may be equal to $(\hat{x}_t, \hat{x}_{t+1}, \ldots, \hat{x}_{t+k})$, where $\hat{x}_{t+k} = x_{t+k}$.

The electronic device 102 may determine 506 a forward-backward error between the forward trajectory and the backward trajectory. The forward-backward error may be defined as the distance between the forward trajectory and the backward trajectory. Further, various distances may be defined for the trajectory comparison. In one configuration, the Euclidean distance between the initial point and the end point of the validation trajectory may be used when determining the forward-backward error. In one configuration, the forward-backward error may be used as the tracking error, which may be used to determine a tracking confidence value 228.

Figure 6:
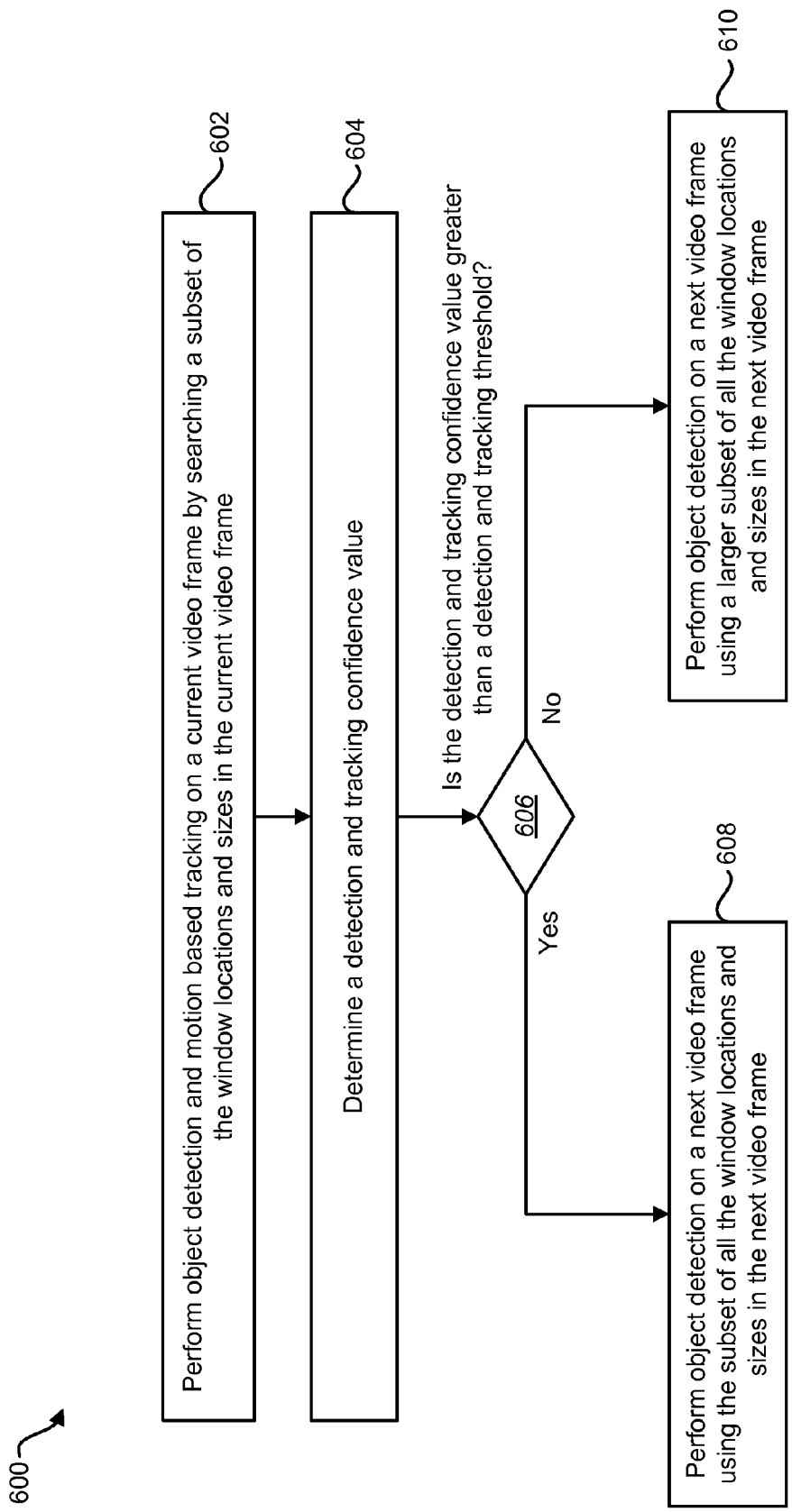
FIG. 6 is a flow diagram illustrating a method for performing object detection and tracking.

FIG. 6 is a flow diagram illustrating a method 600 for performing object detection and tracking. The method 600 may be implemented by an electronic device 102 (e.g., an object tracking and detection module 104). The electronic device 102 may perform 602 object detection and motion-based tracking on a current video frame (N) 224 by searching a subset of the window locations and sizes in the current video frame (N) 224.

The electronic device 102 may determine 604 a detection and tracking confidence value 256. The detection and tracking confidence value 256 may provide a level of confidence of whether the target object is found in a current video frame (N) 224 or within a particular window. The electronic device 102 may also determine 606 whether the detection and confidence value 256 is greater than a detection and tracking threshold 254. If the detection and confidence value is greater than a detection and tracking threshold 254, the electronic device 102 may perform 608 object detection on a next video frame using the subset (e.g., the same subset) of windows and sizes in the next video frame. Alternatively, if the detection and confidence value 256 is less than a detection and tracking threshold 254, the electronic device 102 may perform 610 object detection on a next video frame using a larger subset of the window locations and sizes in the next video frame. In some configurations, where the confidence value 256 is less than a detection and tracking threshold 254, the electronic device 102 may perform 610 object detection on a next video frame using the entire search space and/or all windows of the next video frame.

Figure 7A:
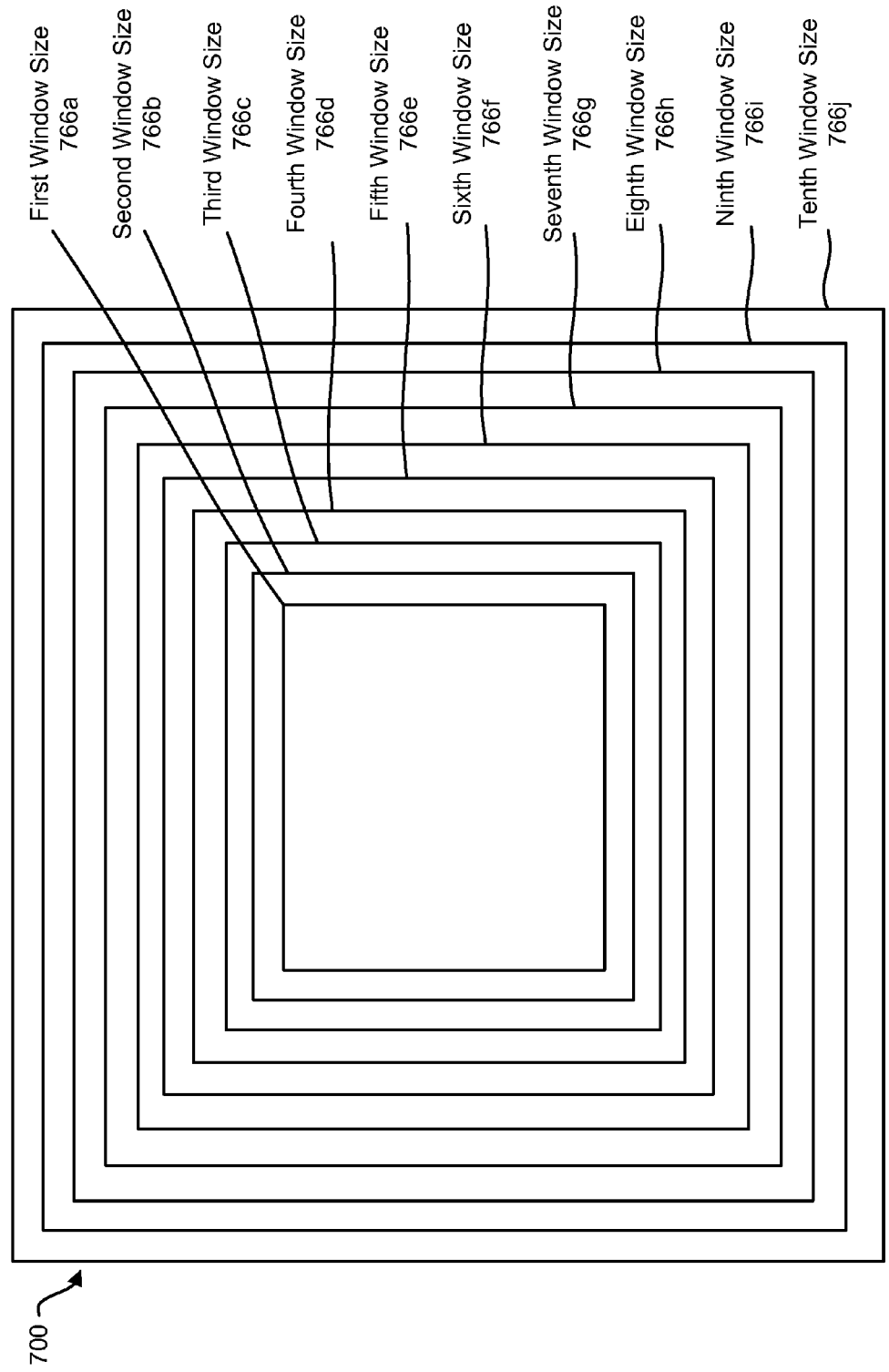
FIG. 7A is a block diagram illustrating an image window having different window sizes that may be used with the present systems and methods.

FIG. 7A is a block diagram illustrating an image window 700 having different window sizes 766 that may be used with the present systems and methods. Specifically, FIG. 7A illustrates a set of ten possible window sizes 766a-j. Although shown herein as rectangular, the windows that are searched may be any shape, e.g., square, rectangular, circular, elliptical, user-defined, etc. Furthermore, any number of window sizes may be available, e.g., 5, 15, 20, 30, etc.

In some configurations, the search range may be denoted by a subset of window sizes used for a particular location, e.g., the window sizes that are searched in the current video frame (N) 224 may be limited to those similar to the window location and window size associated with the target object in the recent frame. For example, without feedback, the object detector 208 may search all ten window sizes for each selected window location. However, if the object was detected in a recent (non-current) video frame using a window with the fifth window size 766e, the scanner scaler 236 may select only window sizes for the current captured frame of 5, plus or minus 3, i.e., window sizes 2-8. In other words, the windows with the first window size 766a, ninth window size 766i and tenth window size 766j may not be searched based on feedback from a recent or previous video frame (N−1) 222. This may further eliminate low probability searching and increase the efficiency of object detection. In other words, using feedback from a recent video frame may help reduce computations performed. Alternatively, if a recent video frame did not detect the target object (i.e., the detection and tracking confidence value 256 for the recent captured frame is less than a detection and tracking threshold 254), the object detector 208 may not limit the search range by using a subset of size levels.

Figure 7B:
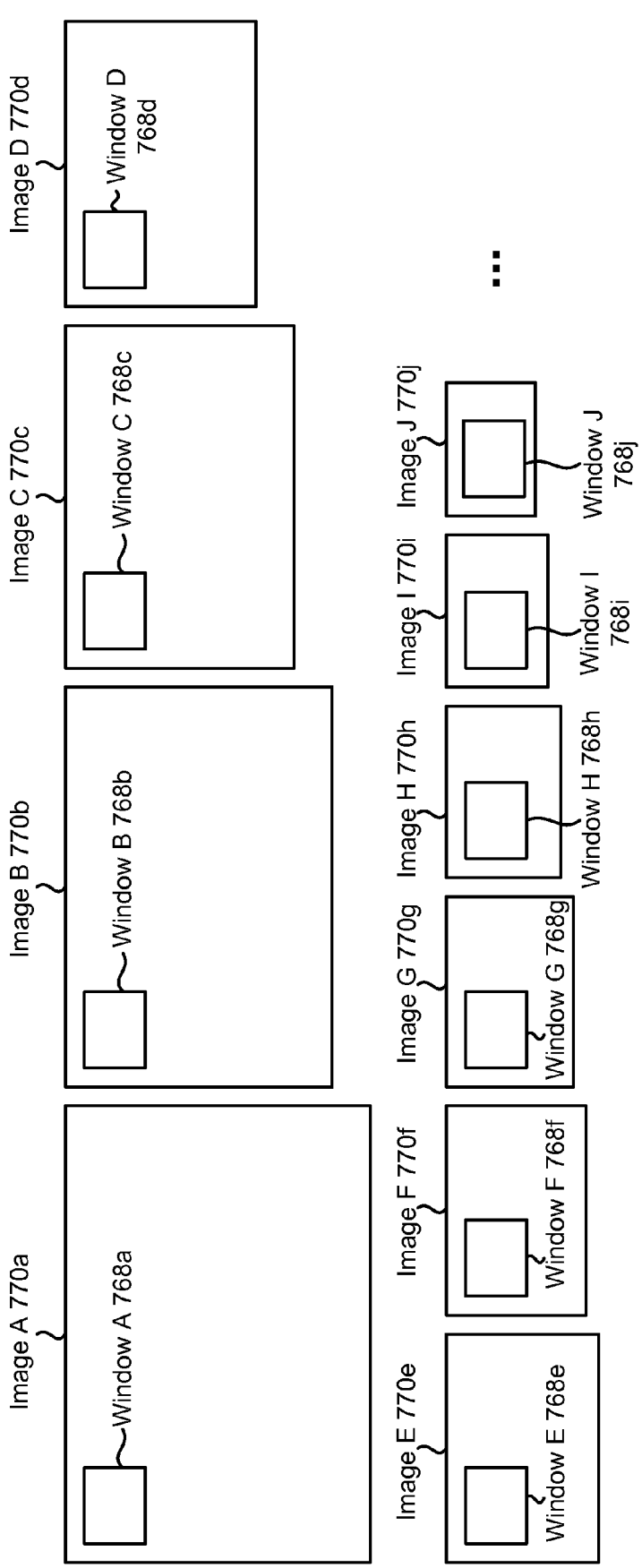
FIG. 7B is a diagram illustrating several example images and windows that may be used with the present systems and methods.

FIG. 7B is a diagram illustrating several example images 770a-j and windows 768a-j that may be used with the present systems and methods. In particular, FIG. 7B illustrates an approach for scanning images. In this approach, different image sizes or scales may be searched, while the window size may remain the same. As illustrated in FIG. 7B, images A-J 770a-j have different image sizes or scales, while all of windows A-J 768a-j have the same size. Accordingly, the approach illustrated in FIG. 7B may be implemented in accordance with one or more configurations of the systems and methods disclosed herein. For example, the approach described in connection with FIG. 7B may be implemented in addition to or alternatively from the approach described in connection with FIG. 7A. In some configurations, different image scales (e.g., scale levels) may be determined from a base image. For example, assume that image A 770a is a base image. Images B-J 770b-j may be scaled versions of the base image A 770a. For example, an electronic device (e.g., electronic device 102, 1402) may scale the base image 770a into one or more other scales.

In some configurations, scaling the base image may include downsampling the image. For example, an electronic device (e.g., electronic device 102, 1402) may scale an image using bilinear interpolation. Downsampling may include taking a weighted average of neighboring pixels to produce a scaled pixel. For example, assume that a base image is downsampled or scaled by a factor of 2. In this example, 2 pixels in a first dimension (e.g., width) and 2 pixels in a second dimension (e.g., height) may be averaged (where each pixel is given a weight of 0.25, for example) to produce a single pixel in the downsampled version of the image. In some cases, downsampling may be performed by a factor that does not evenly divide the number of pixels. In this case, different pixels may be given different weights to produce the downsampled image.

Figure 8:
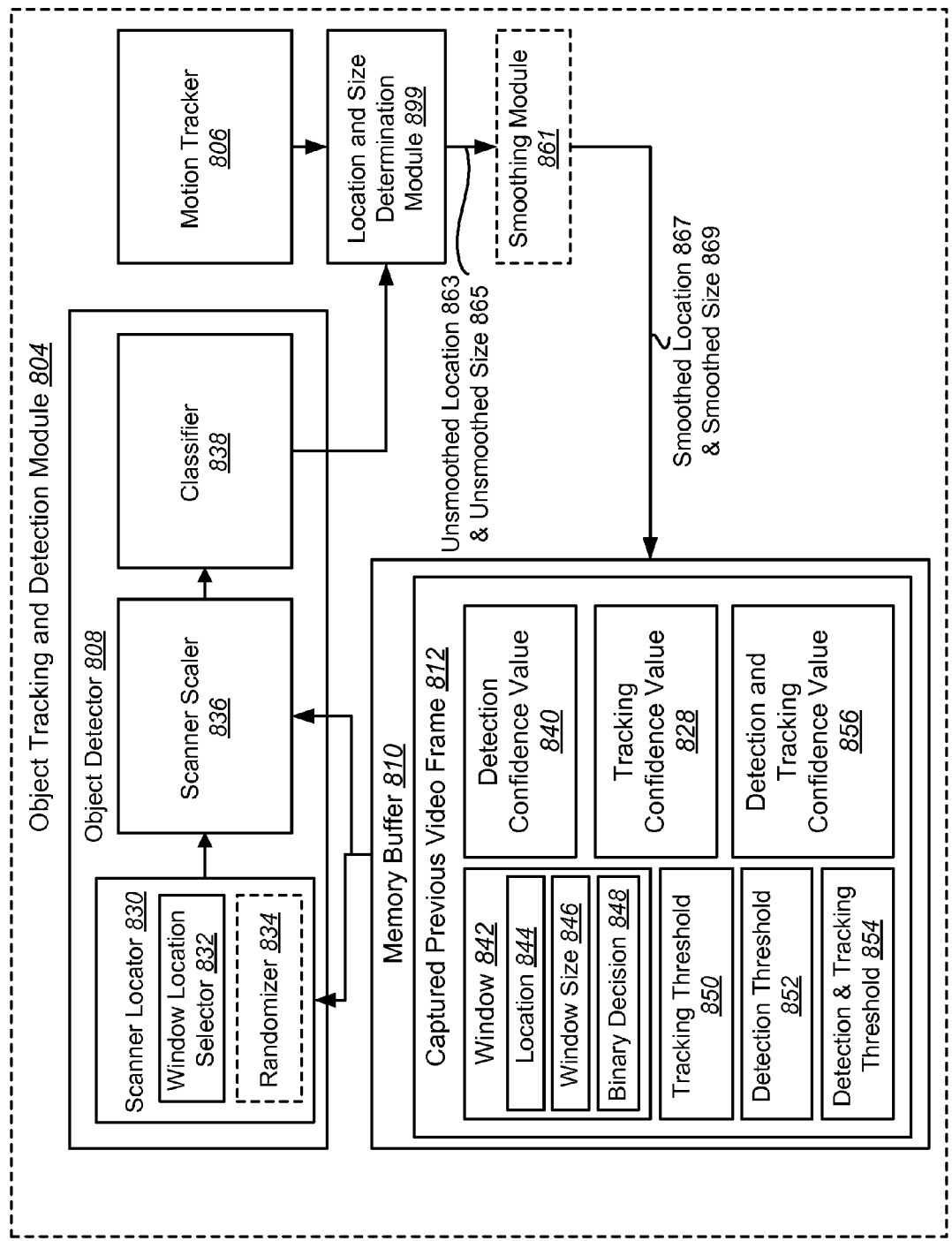
FIG. 8 is a block diagram illustrating another possible configuration of an object tracking and detection module.

FIG. 8 is a block diagram illustrating another possible configuration of an object tracking and detection module 804. The object tracking and detection module 804 illustrated in FIG. 8 may include similar modules and perform similar functionality to the object tracking and detection module 204 illustrated in FIG. 2. Specifically, the object detector 808, motion tracker 806, scanner locator 830, window location selector 832, randomizer 834, scanner scaler 836, classifier 838, location and size determination module 899, memory buffer 810, captured previous video frame 812, window 842, location 844, size 846, binary decision 848, tracking threshold 850, detection threshold 852, detection and tracking threshold 854, detection confidence value 840, tracking confidence value 828 and detection and tracking confidence value 856 illustrated in FIG. 8 may correspond and have similar functionality to the object detector 208, motion tracker 206, scanner locator 230, window location selector 232, randomizer 234, scanner scaler 236, classifier 238, fusion module 260, memory buffer 210, captured previous video frame 212, window 242, location 244, size 246, binary decision 248, tracking threshold 250, detection threshold 252, detection and tracking threshold 254, detection confidence value 240, tracking confidence value 228 and detection and tracking confidence value 256 illustrated in FIG. 2.

In addition, the object tracking and detection module 804 may include a smoothing module 861 that is used to reduce the jittering affect due to target motion and tracking error. In other words, the smoothing module 861 smooth the tracking results, causing a search window to have a smoother trajectory in both location (x, y) 844 and size (width, height) 846. The smoothing module 861 can be simple moving average (MA) filters or auto regression (AR) filters. The smoothing degree for the location 844 and size 846 can be different. Predictive filters, such as a Kalman filter may also be suitable for location 844 smoothing.

In one configuration, the location and size determination module 899 may output the combined result of motion tracking and object detection, which may be represented by a bounding box. This bounding box may include both location and size information that is smoothed by the smoothing module 861. Therefore, the smoothing module 861 may receive an unsmoothed location 863 and an unsmoothed size 865 as input and output a smoothed location 867 and a smoothed size 869. In some configurations, the location and size determination module 899 may be implemented as part of the fusion module 260 described in connection with FIG. 2. In other configurations, the location and size determination module 899 may perform one or more of the functions described above in connection with the fusion module 260 described in connection with FIG. 2.

Figure 9:
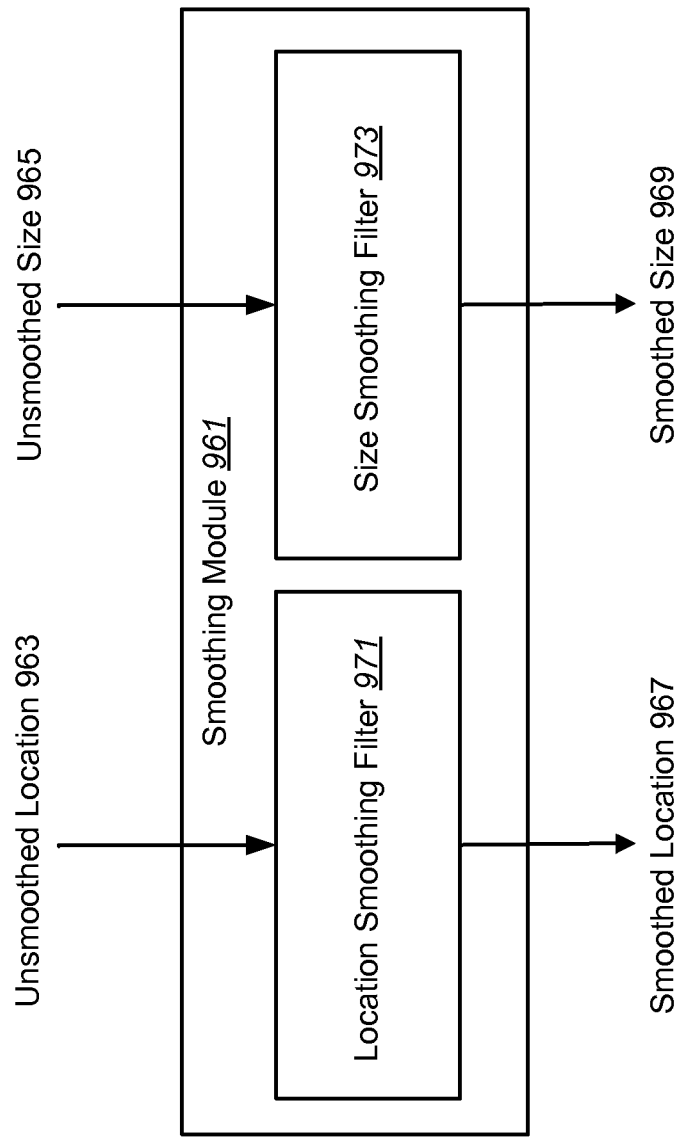
FIG. 9 is a block diagram illustrating a smoothing module.

FIG. 9 is a block diagram illustrating a smoothing module 961. The smoothing module 961 may be used to reduce the jittering affect due to target motion and tracking error, i.e., so the tracking results (bounding box) has a smoother trajectory in both location (x, y) and size (width, height). In one configuration, the location smoothing filter 971 and the size smoothing filter 973 are implemented using an auto regression (AR) model to receive an unsmoothed location 963 and an unsmoothed size 965 as input and output a smoothed location 967 and a smoothed size 969.

In an auto regression (AR) model, assume X is the variable to be smoothed, either the location or the size. Furthermore, let X' be the output of X by the object tracker. In this configuration, the smoothed filtering of X at time t, $X_t$, can be described according to Equation (1):

$$X_t = W * X' + (1-W) * X_{t-1} \quad (1)$$

where $X'_t$ is the tracker output of X at time t, $X_{t-1}$ is the smoothed result of X at time t−1, and W (0<=W<=1) is a smoothing weight that controls the smoothing effect. For example, $X'_t$ may be a window location or window size selected for a current video frame and $X_{t-1}$ may be a window location or window size used for a previous video frame.

A different smoothing weight, W, can be used for the location smoothing filter 971 and the size smoothing filter 973. For example, in one implementation, $W_{location}=0.8$ and $W_{size}=0.4$ so that there is less smoothing effect on the window location but stronger smoothing effect on the window size. This selection of smoothing weights will produce both less tracking delay and less jittering.

Furthermore, the selection of smoothing weight may also be reduced when the detection and tracking confidence value 856 falls below a certain threshold (e.g., the detection and tracking threshold 854). This may cause stronger filtering when potential tracking or detection errors are high. For example, in response to low tracking confidence (e.g., the detection and tracking confidence value 856 is below the detection and tracking threshold 854), the smoothing weights for location and size may be set to $W_{location}$=0.65 and $W_{size}$=0.2, respectively. In other words, one or both of the weights may be decreased, which may cause the window location and size selection to lean more heavily on window locations and sizes of previous video frames than those of a current video frame.

Furthermore, the weighting may be based on a tracking confidence value 828 or a detection confidence value 840 rather than a detection and tracking confidence value 856. For example, the smoothing weights, $W_{location}$ and $W_{size}$, may be decreased in response to a tracking confidence value 828 falling below a tracking threshold 850, i.e., stronger filtering may be used in response to poor motion tracking. Alternatively, the smoothing weights may be decreased in response to a detection confidence value 840 falling below a detection threshold 852, i.e., stronger filtering may be used in response to poor object detection.

In another configuration, Kalman filtering may be used to smooth the window location. In such a configuration, the filtering may be defined according to Equations (2)-(7):

$$x_k = F_k x_{k-1} w_k \quad (2)$$

$$z_k = H x_{k-1} v_k \quad (3)$$

where $z_k$ is the observation or measurement of $x_k$, and $x_k$ is the true state defined by $x_k=[x, y, \dot{x}, \dot{y}]$, where (x,y) are the bounding box center location, $(\dot{x}, \dot{y})$ are the velocity in each direction. Additionally, $x_{k-1}$ is the previous state at time k−1. Furthermore, the state transition model, $F_k$, and the observation model, H, may defined by Equations (4)-(5), respectively:

$$F_k = \begin{bmatrix} 1, & 0, & \Delta t, & 0 \\ 0, & 1, & 0, & \Delta t \\ 0, & 0, & 1, & 0 \\ 0, & 0, & 0, & 1 \end{bmatrix} \quad (4)$$

$$H = \begin{bmatrix} 1, & 0, & 0, & 0 \\ 0, & 1, & 0, & 0 \end{bmatrix} \quad (5)$$

where $\Delta t$ is a tunable parameter. Additionally, wk is process noise that is assumed to be drawn from a zero mean multivariate normal distribution with covariance Q (i.e., $w_k \sim N(0,Q)$) according to Equation (6):

$$Q = \begin{bmatrix} 1, & 0, & 0, & 0 \\ 0, & 1, & 0, & 0 \\ 0, & 0, & 1, & 0 \\ 0, & 0, & 0, & 1 \end{bmatrix} * \sigma_1^2 \quad (6)$$

where $\sigma_1$ is a tunable parameter. Similarly, wk is observation noise that is assumed to be zero mean Gaussian white noise with covariance R (i.e., $v_k \sim (0,R)$) according to Equation (7):

$$R = \begin{bmatrix} 1, & 0, & 0, & 0 \\ 0, & 1, & 0, & 0 \\ 0, & 0, & 1, & 0 \\ 0, & 0, & 0, & 1 \end{bmatrix} * \sigma_2^2 \quad (7)$$

where $\sigma_2$ is a tunable parameter.

Figure 10:
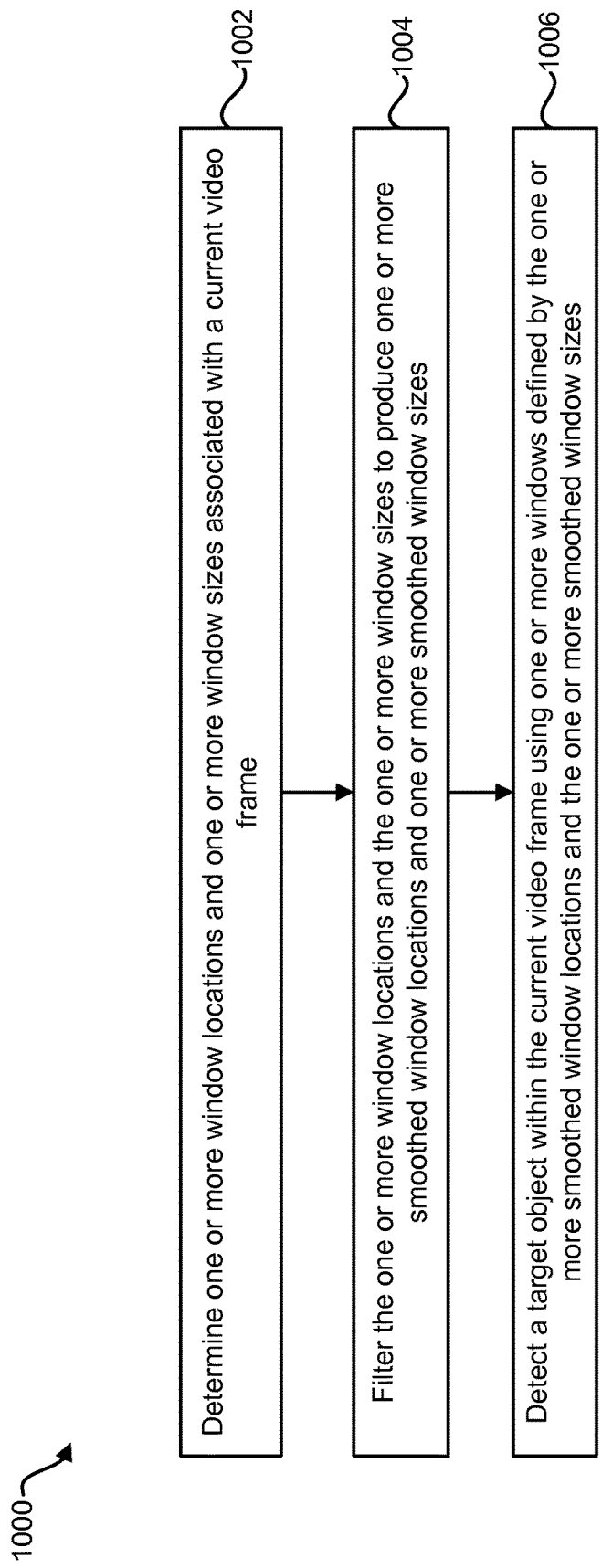
FIG. 10 is a flow diagram illustrating a method for smoothing jitter in motion tracking results.

FIG. 10 is a flow diagram illustrating a method 1000 for smoothing jitter in motion tracking results. The method 1000 may be performed by an electronic device 102, e.g., an object tracking and detection module 804 in an electronic device 102. The electronic device 102 may determine 1002 one or more window locations and one or more window sizes associated with a current video frame, e.g., an unsmoothed location 863 and unsmoothed size 865. The electronic device 102 may also filter 1004 the one or more window locations and the one or more window sizes to produce one or more smoothed window locations 867 and one or more smoothed window sizes 869. For example, this may include using a moving average filter, an auto regression filter or a Kalman filter. In one configuration, in response to low tracking confidence (e.g., the detection and tracking confidence value 856 is below the detection and tracking threshold 854), the smoothing weights for location and size may be reduced. Alternatively, the smoothing weights may be reduced based on the detection confidence value 840 or the tracking confidence value 828. The electronic device may also detect a target object within the current video frame 224 using one or more windows defined by the one or more smoothed window locations 867 and the one or more smoothed sizes 869.

Some configurations of the systems and methods disclosed herein may provide for balancing sliding windows and/or scanning step windows for multi-scale real-time object detection on an image pyramid. For object detection using a sliding window and/or scanning windows over images on a pyramid, when the object is small, the detection may need to be performed on a larger pyramid image, where the number of image locations to be scanned increase proportional to the size of the images. In general, it may be difficult to process all windows in real-time with limited computing resources on a mobile device.

The systems and methods disclosed herein may balance the number of scanning windows on each image, such that the computation requirement does not increase as the object to be detected gets smaller. The trade-off lies in the time spent to traverse all possible locations on the image and accuracy of each detection.

The systems and methods disclosed herein may provide one or more of the following approaches. The sliding window and/or scanning window steps may be increased as the detection moves to a lower octave of a pyramid (with larger image size). When the scanning step is proportional to the area increase of the images, the number of windows to be scanned in each octave may remain approximately the same. This may provide a trade-off between total computations and time-to-detect (e.g., number of frames). The larger the scanning steps, the longer (e.g., more frames) it may take to detect an object from a video sequence. However, when the computational resource is limited, the approach allows scanning a larger image without dropping the frame rate, achieving "seeing farther and smaller."

Figure 11:
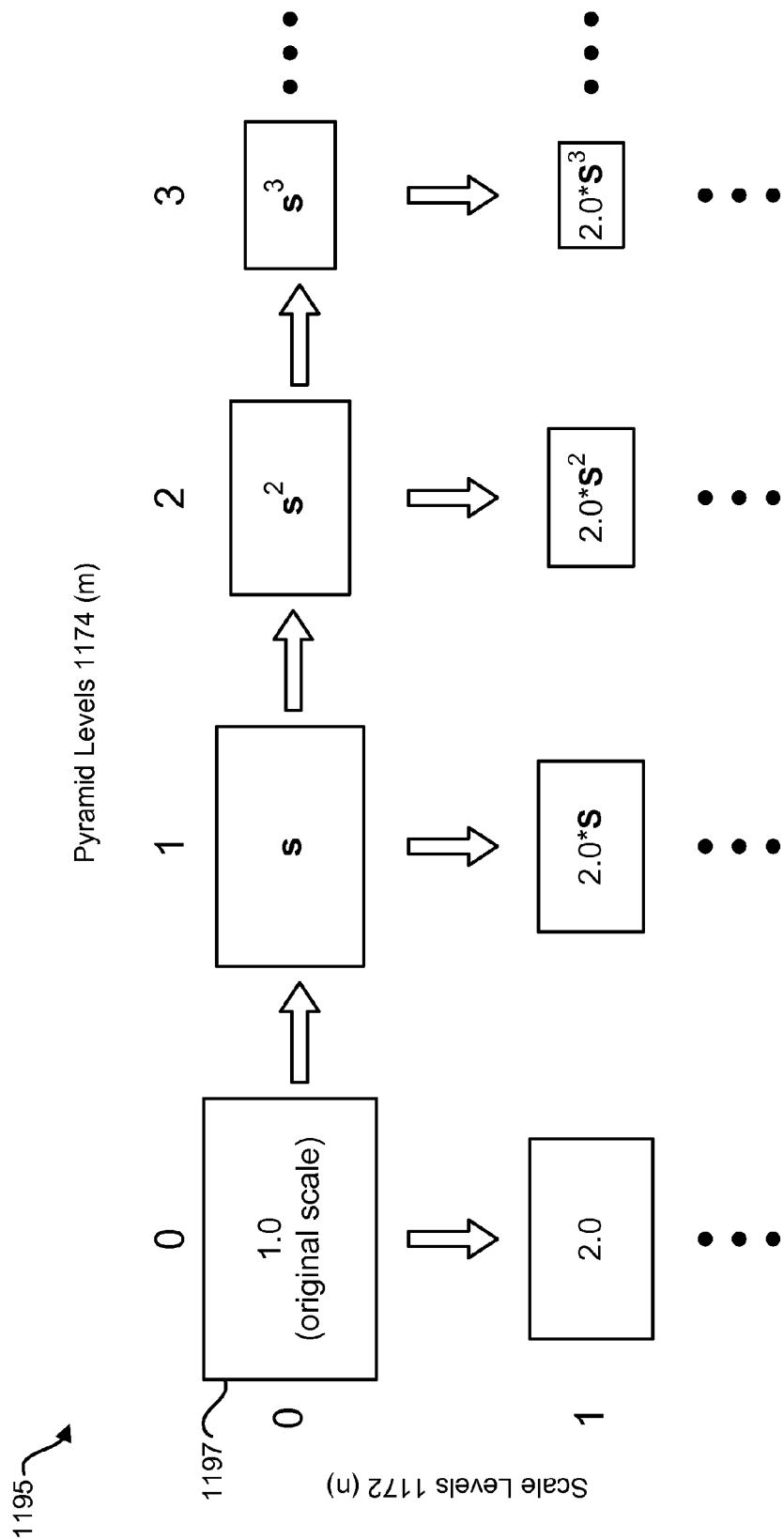
FIG. 11 is a diagram illustrating one example of a portion of a Gaussian pyramid.

FIG. 11 is a diagram illustrating one example of a portion of a Gaussian pyramid 1195. In FIG. 11, each of the rectangles represents an image. From the original scale (e.g., the base image 1197 with a scale factor of 1), each increasing pyramid level (e.g., m=1, 2, 3, etc.) is downsampled by a factor of s. In some configurations, the factor s=M$\sqrt{2.0}$, where M is a total number of pyramid levels 1174 in the pyramid 1195. Furthermore, each increasing scale level 1172 is downsampled by a numeric factor. Any numeric factor that monotonically increases over the scale levels 1172 may be used. Additionally or alternatively, the numeric factors may be uniform or non-uniform per scale level. In one example, on pyramid level 0, the numeric factor may uniformly increase by 2 at each scale level 1172. Accordingly, 1.0 may be the numeric factor for scale level 0, 2.0 may be the numeric factor for scale level 1 and 4.0 may be the numeric factor for scale level 2 and so on. In another example, 1.0 may be the numeric factor for scale level 0, 1.5 may be the numeric factor for scale level 1 and 4.0 may be the numeric factor for scale level 2, illustrating a non-uniform numeric factor increase over scale levels.

In the example illustrated in FIG. 11, the numeric factor is 2. In the case where the numeric factor is 2 across all scale levels 1172, as illustrated in FIG. 11, the scale levels 1172 may be referred to as "octave levels." With octave levels, each octave level is approximately half the size in each dimension (e.g., half the width of and half the height of) the neighboring lower octave level. Additionally, each octave level may have approximately one-fourth of the pixels of the neighboring lower octave level. These may be approximate due to uneven division and rounding in some cases.

Accordingly, FIG. 11 illustrates (along a vertical axis, for example) different scales for Gaussian pyramid 1195 generation. As the pyramid level 1174 and scale level 1172 further increase, the images become smaller. The systems and methods disclosed herein may provide greater efficiency in scanning computation relating to Gaussian pyramids.

The systems and methods disclosed herein may provide for balancing a number of sliding windows across the pyramid. For example, the systems and methods disclosed herein may provide a scanning window strategy that allows controlled (e.g., limited, approximately constant, etc.) computation across each scale level. In some configurations, this may be applied for tracking an object in video.

Figure 12:
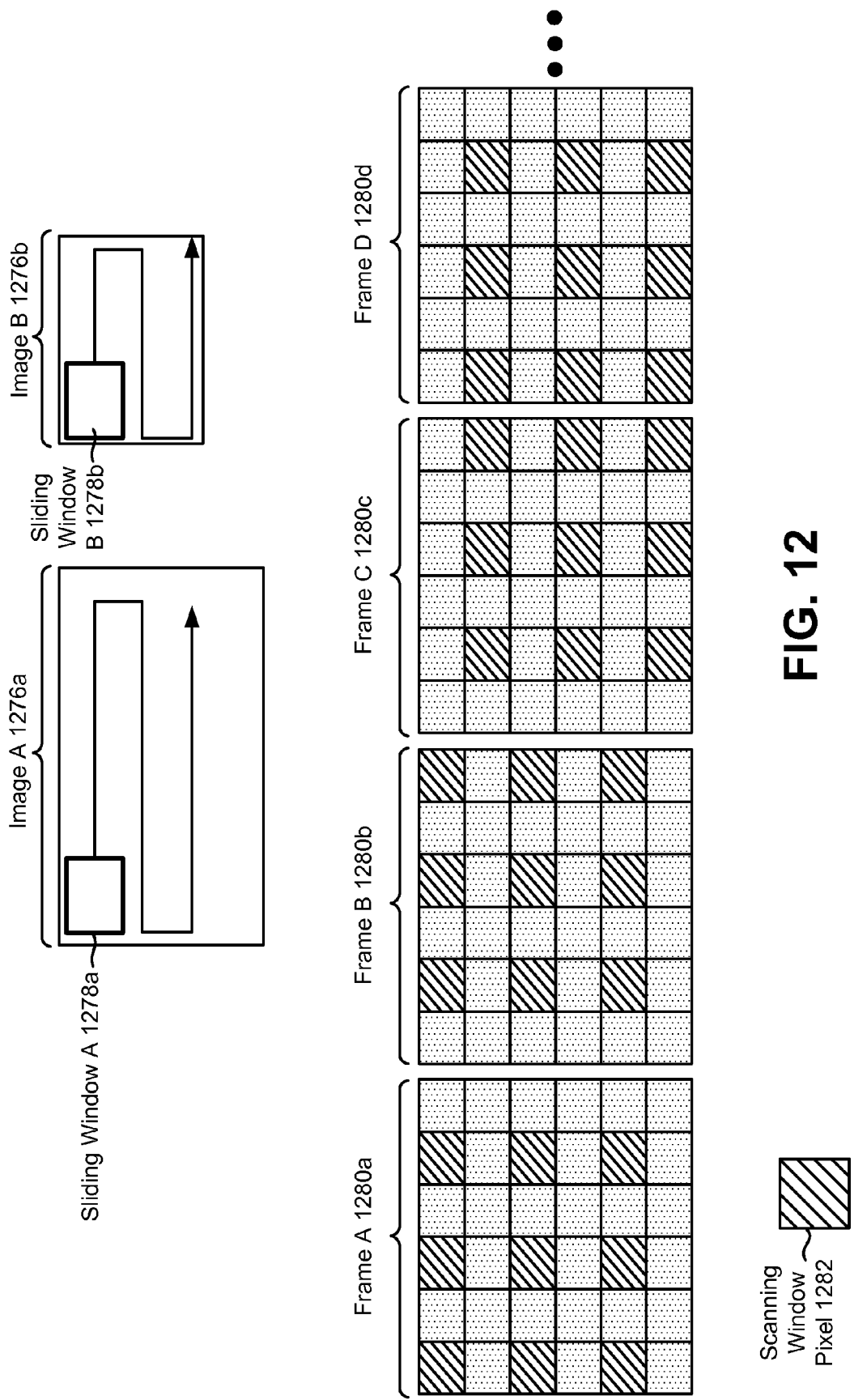
FIG. 12 is a diagram illustrating examples of sliding windows and scanning step windows.

FIG. 12 is a diagram illustrating examples of sliding windows and scanning step windows. Specifically, image A 1276a and image B 1276b are two different image sizes or scales. Scanning window A 1278a is applied in a zig-zag pattern to image A 1276a. Similarly, scanning window B 1278b is applied in a zig-zag pattern to image B 1276b. In some configurations, sliding window A 1278a and sliding window B 1278b may be of the same or substantially the same size (i.e., fixed window size). In addition to the zig-zag pattern or alternatively, a scanning window may be applied in a scan-line pattern. For each image on the pyramid (e.g., the Gaussian pyramid 1195 of FIG. 11), an electronic device may run a sliding window-based detector (with a fixed window size, for example) over one or more possible locations of the image.

Some configurations of the systems and methods disclosed herein may utilize a scanning step. For example, when scanning all possible locations of an image is too computationally expensive, one approach is to skip image locations in one frame (along a scan path, for example), and then scan the skipped windows in other frames (e.g., subsequent frames). Different scanning patterns may be applied. In the example of frames A-D 1280a-d in FIG. 12, a scanning step of 2 in the width dimension (e.g., x dimension, X-step=2) and a scanning step of 2 in the height dimension (e.g., y dimension, Y-step=2) are illustrated. Each frame 1280a-d may include a group of pixels. For convenience of illustration in FIG. 12, the frames 1280a-d may represent small images (e.g., 6×6 pixel images) or portions of larger images (e.g., a 6×6 pixel section of a larger image).

Specifically, scanning window pixels 1282 are illustrated in each frame A-D 1280a-d. Each scanning window pixel 1282 is an upper-left pixel (e.g., starting location) of each scanning window. For example, frame A 1280a includes 9 scanning window pixels 1282, where each of the scanning window pixels 1282 is an upper-left pixel of a corresponding scanning window. Accordingly, frame A 1280a includes 9 scanning windows. Each scanning window may cover a number of pixels (e.g., 16×16 pixels, 24×24 pixels, etc.). Accordingly, scanning windows may overlap. Specifically, for example, scanning windows overlap unless the scanning step is greater than or equal to the window width.

In the example of frames A-D 1280a-d, a full scan of an image (e.g., all scanning window locations) takes 4 frames. For instance, the scanning windows corresponding to the scanning window pixels 1282 may be scanned at each frame. In particular, pixels within the scanning windows at frame A 1280a (e.g., at a first time or at a first frame) may be scanned. Then, the scanning windows may be shifted, where the pixels of the scanning windows are scanned for a subsequent frame. For example, the pixels included in scanning windows at frame B 1280b may be scanned and so on. In some configurations, each group of windows (e.g., four windows in FIG. 12) may be scanned over frames proceeding in a zig-zag pattern, in a clockwise pattern, in a counter-clockwise pattern or in another order (e.g., upper-left, lower-right, upper-right, lower-left, etc.).

In some configurations, a scanning step may be viewed as a skip size (e.g., a number of windows and/or pixels skipped). For example, a scanning step of two in a first dimension (e.g., width dimension, x dimension, etc.) and a scanning step of two in a second dimension (e.g., height dimension, y dimension, etc.) may lead to the scanning pattern of frames A-D 1280a-d as illustrated in FIG. 12. For example, only one-fourth of the possible scanning windows may be scanned in each frame.

In some configurations, the possible scanning window locations (e.g., start locations) may correspond to fewer than all of the pixels. For example, the possible scanning window locations (e.g., start locations) may correspond to every-other pixel (e.g., every two pixels at pixel indices 0, 2, 4, etc.) or less, such as every three pixels (e.g., at pixel indices 0, 3, 6, etc.). As described above, it should be noted that the scanning step may be viewed as a number of windows skipped. For instance, in a configuration where the possible scanning window locations correspond to every-other pixel (e.g., pixel indices of 0, 2, 4, 6, 8, 10, etc.), a scanning step of 2 may result in starting pixels of the scanning windows at pixel indices 0, 4, 8, etc., for a first frame and 2, 6, 10, etc., for a second frame.

Figure 13:
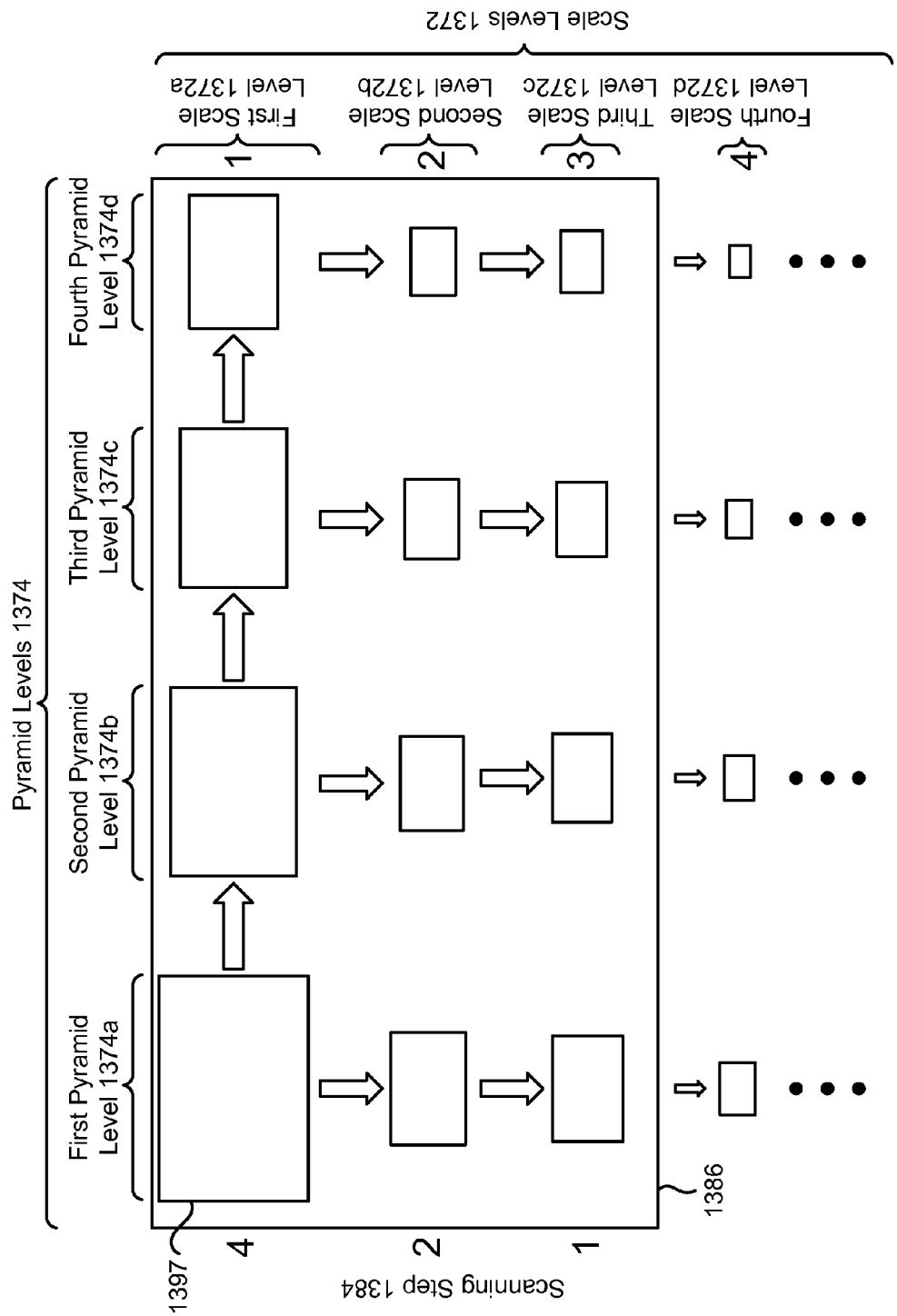
FIG. 13 is a diagram illustrating an example of scanning steps across scale levels in accordance with some configurations of the systems and methods disclosed herein.

FIG. 13 is a diagram illustrating an example of scanning steps across scale levels 1372 in accordance with some configurations of the systems and methods disclosed herein. For example, the systems and methods disclosed herein may provide an approximately balanced number of scanning windows across each of the scale levels 1372. In FIG. 13, each of the rectangles represents an image in an image pyramid. For example, the upper-left rectangle may represent a base image 1397 from which the other images are derived. As described above, for example, an electronic device may scale (e.g., downsample) the base image 1397 into one or more scales at one or more scale levels 1372. As described above, each increasing pyramid level (e.g., m=1, 2, 3, etc.) is downsampled. Furthermore, each increasing scale level 1372 is downsampled by a numeric factor. It should be noted that all of the images in the image pyramid may correspond to a frame (e.g., be based on a frame, derived from a frame, downsampled from a frame, etc.). For example, an electronic device may obtain an image pyramid (e.g., a set of images) for each frame. For instance, an electronic device may scale the base image to obtain the scale levels 1372. The base image 1397 may be any size (e.g., any set of dimensions, any number of pixels, etc.). Some examples of image sizes (e.g., dimensions in pixels (px)) include 4K (4096×2304), 2880×1800, 2560×1440, 1334×750, 1080p (1920×1080), 720p (1280×720), 1024×576, 312×390, 272×340, QVGA (320×240), etc.

In FIG. 13, four pyramid levels 1374*a-d* and four scale levels 1372*a-d* are illustrated. It should be noted, however, that different numbers of pyramid levels 1374 and/or scale levels 1372 may be utilized.

An electronic device may scan two or more of the scale levels 1372 for a frame, where a number of scanning windows is equal for each scale level 1372 at the first pyramid level 1374*a*. Accordingly, computation for each scale level 1372 is characterized by (e.g., limited by) the number of scanning windows multiplied by a number of pyramid levels 1374. Equalizing the number of scanning windows for each scale level 1372 at the first pyramid level 1374*a* may approximately equalize the amount of computation (e.g., the number of scanning windows scanned) between scale levels 1372.

For example, assume that the first through third scale levels 1372*a-c* are scanned and that the first pyramid level 1374*a* (e.g., the left-most column in FIG. 13) of the third scale level 1372*c* is scanned using 12 scanning window locations. In this example, the first pyramid level 1374*a* of the second scale level 1372*b* is scanned at 12 scanning window locations and the first pyramid level 1374*a* of the first scale level 1372*a* is scanned at 12 scanning window locations. Accordingly, computation at each scale level 1372 is substantially constant (e.g., limited), since the number of scanning window locations for each increasing pyramid level 1374*a-d* will be less than or equal to the number of scanning window locations used for the corresponding image at the first (e.g., lowest) pyramid level 1374*a*.

Using the same number of same-sized scanning windows for larger images (e.g., at lower scale levels) may result in covering a smaller proportion of the larger images in comparison to images at higher scale levels as a result of, for example, applying an increasing scanning step with increasing image size (decreasing scale level). For example, assume that the image at the first scale level and the first pyramid level has four times the number of pixels as the image at the second scale level and first pyramid level. Using the same number of scanning windows for both of these images results in covering a relatively smaller proportion of the larger image in comparison to the smaller image. Accordingly, more frames may be required to cover all scanning window locations at a lower scale (e.g., lower scale level 1372) in comparison to a higher scale (e.g., higher scale level 1372).

As described above, scanning step may be utilized to scan one or more of the images in some configurations. In accordance with the systems and methods disclosed herein, the scanning step may be set proportional to the dimensions of the image for one or more of the images (e.g., the images in the first pyramid level 1374*a*). For example, assume that the scale levels 1372 are octaves. In the example illustrated in FIG. 13, the scanning step 1384 (for each dimension) may be 4 for the first scale level 1372*a*, may be 2 for the second scale level 1372*b* and may be 1 for the third scale level 1372*c*. For instance, assume that the scanning step 1384 at the third scale level 1372*c* is 1 (e.g., 1 for the x or width dimension and 1 for the y or height dimension). At the first pyramid level 1374*a*, the dimensions of the image at the second scale level 1372*b* are two times the dimensions of the image at the third scale level 1372*c*. Accordingly, the scanning step 1384 at the second scale level 1372*b* is 2 (e.g., 2 for the x or width dimension and 2 for the y or height dimension). Similarly, the dimensions of the image at the first scale level 1372*a* are four times the dimensions of the image at the third scale level 1372*c*, leading to a scanning step 1384 of 4 (e.g., 4 for the x or width dimension and 4 for the y or height dimension).

In some configurations, a first dimension (e.g., x dimension) scanning step for one or more additional pyramid levels 1374*b-d* at a scale level 1372 is equal to a first dimension scanning step 1384 corresponding to an image at the first pyramid level 1374*a* of the scale level 1372. Furthermore, a second dimension (e.g., y dimension) scanning step for the one or more additional pyramid levels 1374*b-d* at the scale level 1372 is equal to a second dimension scanning step corresponding to the image at the first pyramid level 1374*a* of the scale level. Additionally or alternatively, each number of scanning windows corresponding to each of one or more additional pyramid levels 1374*b-d* of a scale level 1372 is less than or equal to a number of scanning windows corresponding to the first pyramid level 1374*a* of the scale level 1372. Accordingly, computation for each scale level 1372*a-d* is characterized by the number of scanning windows multiplied by a number of pyramid levels 1374. For example, one or more of these approaches may limit computation at each scale level 1372*a-d* and/or may approximately equalize computation (e.g., a number of scanning windows) at each scale level 1372*a-d* (e.g., between scale levels 1372*a-d*).

As described above, the scale levels 1372 may be octaves in some configurations. Accordingly, the scanning steps may be increased at the lower octaves. In some configurations, the number of windows to be scanned on each scale level 1372*a-d* (e.g., octave level) may be the same. The number of computations for each octave level may be the same in these configurations. Accordingly, the number of sliding windows across the pyramid may be balanced, even for more distant and smaller objects (on large image sizes, for instance). In some configurations, this may be applied for object detection and/or tracking of an object (e.g., big objects, small objects, etc.) in images (e.g., video). It should be noted that although an "octave" is described herein, different scales (e.g., uniform/non-uniform scales, etc.) may be utilized instead of octaves.

It should be noted that the size of an object in the image may be based on a distance between the object and the image sensor and/or based on a zoom level. Accordingly, the size of an object may change from frame to frame. However, large instantaneous changes in size of an object are unlikely. Accordingly, limiting scanning to a range of scale levels 1372 and/or pyramid levels 1374 that are likely to detect the object may be beneficial to reduce the amount of computation. For example, assume that the zoom level of an image sensor remains the same between frames. Further assume that the distance between the image sensor and the object decreases between frames. Accordingly, the size of the object within the image may increase (i.e., the number of pixels in the x and/or y directions increases) between frames. This may result in the object no longer being detected at a particular scanning scale (and/or pyramid level), but being detected at another scanning scale (and/or another pyramid level). For instance, the object may be detected at a higher scale level as the size of the object in the image increases. Because the size of the object in the image is unlikely to change rapidly relative to the frame rate, only a range of scale levels (and/or pyramid levels) relative to the scale (and/or pyramid level) at which the object was most recently detected may be scanned.

Accordingly, the range of scanning (e.g., scale level and/or pyramid level) may change from frame to frame. For example, an electronic device may change the scan range (in scale level and/or pyramid level) based on one or more indications of object size change. For example, the range may be based on a threshold amount of size change (e.g., scale level and/or pyramid level) of the detected object over two or more frames. For instance, if an objected is detected at a fourth pyramid level and fourth scale level in a first frame, and is then detected in a first pyramid level at a third scale level (which indicates more than a threshold amount of size change), the electronic device may expand the scan range to ±2 scale levels at all pyramid levels (instead of ±1 scale level, for example) from the last detected scale level. This principle may similarly be applied in the context of zoom and/or detected motion. In particular, similar approaches may be applied for zoom and/or accelerometer indications. For example, if a rapid (e.g., greater than a threshold amount of) zoom input is received (or detected, for example), the electronic device may expand the scan range and/or may shift the scan scale level and/or pyramid level in accordance with the zoom. Additionally or alternatively, if rapid (e.g., greater than a threshold amount of) motion is detected (by an accelerometer on the electronic device, for example), the electronic device may expand the scan range and/or may shift the scan scale level and/or pyramid level in accordance with the motion. In some configurations, the scan range may be contracted if the detected object size, zoom and/or detected motion are small or static for a number of frames (e.g., if less than a threshold amount of change (in object, size, zoom and/or detected motion) has occurred over a number of frames.

In some configurations, for object detection during tracking, at each frame only the scale level(s) and/or pyramid level(s) close to the scales of the object may be scanned. For example, only images or octaves within a range (e.g., between 0.5× to 2×) of the tracked object scale are scanned. Thus, for the pyramid described in connection with FIG. 13, only 3 scale levels 1372 (e.g., octaves) may be utilized for scanning at each frame. Additionally or alternatively, only images or octaves having a resolution within a range (e.g., between 0.5× to 2×) of the tracked object scale resolution are scanned. It should be noted that adjacent scales (e.g., octaves) may be scanned in some configurations. Alternatively, non-adjacent scales (e.g., octaves) may be scanned.

Accordingly, only image scales within a range 1386 of scales may be scanned in some configurations. For example, assume that an object was last detected and/or tracked with a size at the second scale level 1372. The electronic device may only scan for the object within a particular range 1386 (e.g., ±1 scale level, ±2 scale levels, etc.). In some configurations, the range 1386 may be defined in terms of scale levels 1372. Additionally or alternatively, the range 1386 may be defined in terms of pyramid levels 1374 (e.g., ±1 pyramid level, ±2 pyramid levels, etc.). For example, an electronic device may limit the scanning range to ±1 scale level from the scale level in which the object was last detected and/or tracked for all pyramid levels.

It should be noted that the range 1386 may be shifted and/or changed (e.g., reduced or expanded) from frame to frame. For example, assume that an object is detected at a first frame at the second scale level 1372. In a second frame, the object detection may be performed at the first, second and third scale levels 1372a-c, where the object is detected at the third scale level 1372c. Accordingly, the range 1386 may be shifted to include the second, third and fourth scale levels 1372b-d.

It should be noted that the terms "distance," "zoom" and "size" of an object may refer to the size of an object relative to an image size. For example, a target object at a greater distance may occupy a smaller portion of an image as compared to the same target object at a smaller distance, where the target object at the smaller distance occupies a larger portion of the image. Similarly, a target object at a higher zoom may occupy a larger portion of the image compared to the target object at a lower zoom.

In some configurations, the systems and methods disclosed herein may limit (e.g., balance) the number of scanning steps regardless of the target object distance and/or zoom. For example, when a target object occupies a smaller portion of an image, more window locations may be used to scan in order to detect the smaller object. In this case, a larger scanning step may be utilized, which may require more frames to traverse all scanning locations. Accordingly, computation may be limited at the expense of time. In another case where the target object occupies a larger portion of the image, a smaller scanning step may be utilized, which may require fewer frames to traverse all scanning locations. In accordance with some configurations of the systems and methods disclosed herein, an approximately fixed number (e.g., the same fixed number) of scanning windows may be utilized per frame. While it may require more frames to scan for a smaller target object (at a larger distance, for example), this approach balances the processing demand regardless of the target object size, which allows smaller target objects to be detected, particularly in contexts where processing power is limited (in mobile devices, for example).

When the object becomes smaller, the lower numbered scale levels 1372 (e.g., octaves) are scanned. When the object becomes larger, the higher numbered scale levels 1372 (e.g., octaves) are scanned. Since the scanning windows are limited (e.g., balanced) at each octave by setting the scanning steps proportional to the image dimensions (of the first pyramid level, for example), the number of windows being scanned at each octave may be approximately the same. However, the lower scale levels (e.g., octaves) require more frames to perform a full scan than the higher numbered octaves. This approach allows spreading computations among several frames over time without requesting much higher resources (computations and power), especially when such resources are not available. Accordingly, the number of scanning steps may balance detection accuracy and computation (e.g., processing cycles, power consumption, etc.).

Figure 14:
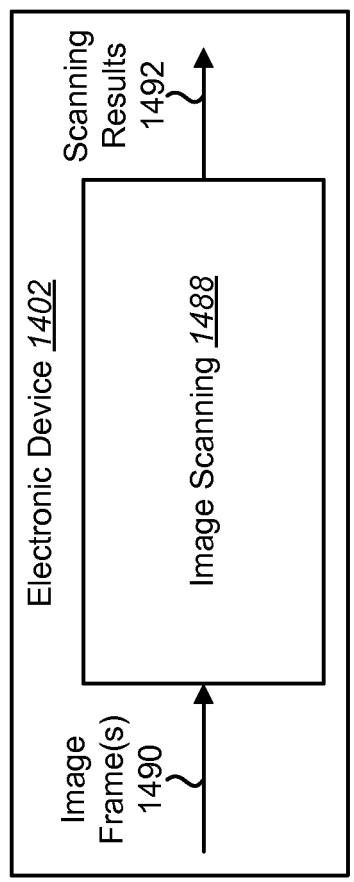
FIG. 14 is a block diagram illustrating one example of an electronic device in which systems and methods for image scanning may be implemented.

FIG. 14 is a block diagram illustrating one example of an electronic device 1402 in which systems and methods for image scanning may be implemented. Examples of the electronic device 1402 include smartphones, cellular phones, computers (e.g., desktop computers, laptop computers, etc.), tablet devices, media players, televisions, gaming consoles, personal digital assistants (PDAs), robots, aircraft, UAVs, automobiles, etc. The electronic device 1402 may include an image scanning module 1488. As used herein, a "module" may be implemented in hardware (e.g., circuitry), or a combination of both (e.g., a processor with instructions).

The electronic device 1402 may perform one or more of the functions, procedures, methods, steps, etc., described in connection with one or more of FIGS. 1-13. Additionally or alternatively, the electronic device 1402 may include one or more of the structures described in connection with one or more of FIGS. 1-13. In some configurations, the image scanning described in connection with FIG. 14 may be implemented in conjunction with one or more of the image scanning, object detection and/or object tracking approaches described in connection with one or more of FIGS. 1-13. It should be noted that the image scanning described in connection with FIG. 13 may be implemented in addition to or alternately from one or more of the approaches to image scanning described in connection with one or more of FIGS. 1-13. For example, the image scanning module 1488 described in connection with FIG. 14 may be implemented in one or more of the electronic devices described above in addition to or instead of the scanning described in connection with one or more of the object tracking and detection modules 104, 204.

The electronic device 1402 may obtain one or more image frames 1490 (e.g., digital images, video, etc.). For example, the electronic device 1402 may capture one or more image frames 1490 (using an integrated and/or separate image sensor, for example) and/or may receive one or more image frames from another device (e.g., a camera, a storage device, another electronic device, etc.). One or more of the image frames 1490 may include an object (e.g., a target object for detection and/or tracking).

One or more of the image frames 1490 may be provided to the image scanning module 1488. The image scanning module 1488 may scan the one or more image frames 1490. For example, the image scanning module 1488 may utilize a sliding window and/or step scanning approach to scan the image frame(s) 1490 for an object. This may be accomplished as described above in connection with one or more of FIGS. 11-13.

The image scanning module 1488 may obtain an image pyramid with a plurality of scale levels and at least a first pyramid level for a frame 1490. For example, the image scanning module 1488 may downsample and/or scale an image (e.g., base image) to produce an image pyramid as described above. In some configurations, the image pyramid may be an octave-based Gaussian pyramid.

In some implementations, the image scanning module 1488 may only produce a limited number of scales in the pyramid. For example, only image scales (e.g., scale levels) within 0.5× to 2× of a scale of an object being tracked or scanned for may be generated. In some configurations, the electronic device 1402 may determine an object scale (based on tracking and/or detection from a previous frame and/or based on an input that indicates the object size, for example). The electronic device 1402 may accordingly determine which image scales (e.g., scale levels and/or pyramid levels) of an image pyramid are within a range. The electronic device 1402 may accordingly produce and/or scan only image scales within the range of scales or sizes of an object. The scanning module 1488 may scan adjacent or non-adjacent scale levels.

The image scanning module 1488 may scan at least two of the plurality of scale levels of the frame 1490 at a plurality of scanning window locations. A number of scanning window locations may be equal for each scale level of the at least two scale levels of the first pyramid level. In some configurations, the scanning window size may be the same regardless of the image size (e.g., scale level and/or pyramid level). This may be as described in connection with FIG. 7B, for example. Accordingly, different image sizes may fit different total numbers of scanning windows (e.g., overlapping and/or non-overlapping scanning windows) within the image. However, scanning all of the possible scanning locations may require a relatively large amount of processing power (e.g., speed), particularly for large (e.g., high resolution) images at a high frame rate.

Some configurations of the systems and methods disclosed herein may be characterized based on the computation at each scale level. For example, the systems and methods disclosed herein may limit, balance and/or approximately equalize, etc., the computation associated with processing the images at each scale level. This may be accomplished by setting a number of scanning window locations equal at two or more scale levels (of at least the first pyramid level, for example). Accordingly, the per-frame computation for each scale level may be characterized by (e.g., limited by) the number of scanning windows set for the image at the first pyramid level multiplied by a number of pyramid levels. More frames may be required to cover (e.g., scan) all scanning window locations at a lower scale in comparison to a higher scale.

In accordance with the systems and methods disclosed herein, the scanning step may be proportional to the dimensions of the image for one or more of the images (e.g., the images in the first pyramid level). Additionally or alternatively, a first dimension (e.g., x dimension) scanning step for one or more additional pyramid levels at a scale level may be equal to a first dimension scanning step corresponding to an image at the first pyramid level of the scale level. Furthermore, a second dimension (e.g., y dimension) scanning step for the one or more additional pyramid levels at the scale level may be equal to a second dimension scanning step corresponding to the image at the first pyramid level of the scale level. Additionally or alternatively, each number of scanning windows corresponding to each of one or more additional pyramid levels of a scale level is less than or equal to a number of scanning windows corresponding to the first pyramid level of the scale level. Accordingly, computation for each scale level is characterized by the number of scanning windows multiplied by a number of pyramid levels. For example, one or more of these approaches may limit computation at each scale level and/or may approximately equalize computation (e.g., a number of scanning windows) at each scale level.

In some configurations, the image scanning module 1488 may determine and/or set the scanning step (e.g., first dimension scanning step and second dimension scanning step) proportional to a corresponding image dimension. For example, the image scanning module 1488 may set a first dimension (e.g., width, x) scanning step proportional to a first dimension of an image at the first pyramid level for each of the scale levels and a second dimension (e.g., height, y) scanning step is proportional to a second dimension of the image at the first pyramid level for each of the scale levels. Larger images will accordingly have a larger scanning step.

In one approach, the image scanning module 1488 may determine and/or set the scanning step based on one or more dimensions of an image. For example, an image at a particular scale level (and at a first pyramid level, for example) may have a predetermined scanning step for one or more dimensions. Alternatively, the image scanning module 1488 may determine a number of scanning steps for the image (based on processor loading, image resolution, etc.). For instance, assume that an image at a first scale level and a first pyramid level has a scanning step of 4 for a width dimension and a scanning step of 4 for a height dimension. Further assume that the image at the first scale level has a width of 160 px and a height of 120 px and that the image at the second scale level has a width of 80 px and a height of 60 px. In order to obtain the scanning step for the image at the second scale level (and at the first pyramid level, for example), the image scanning module may divide the scanning step for the width dimension, 4, by a ratio of the width of the image at the first scale level to the width of the image at the second scale level (e.g., 4/(120 px/60 px)) to yield a scanning step of 2 for the image at the second scale level.

In another approach, the image scanning module 1488 may set the scanning step proportional to the square root of a ratio of the area (e.g., size, pixels) of the image at a first scale level to the area (e.g., size, pixels) of the image at the second scale level at a first pyramid level. For example, assume that an image at a first scale level and a first pyramid level has a scanning step of 4 with dimensions of 160×120 and that an image at the second scale level has dimensions of 80×60. In order to obtain the scanning step for the image at the second scale level (and at the first pyramid level, for example), the image scanning module 1488 may divide the scanning step of the first image in a dimension (e.g., 4) by the square root of the ratio of the area of the first image to the area of the second image $$\left(e.g., \sqrt{\frac{160*120}{80*60}}\right),$$

to yield a scanning step of 2 for the image at the second scale level.

In yet another approach, the image scanning module 1488 may determine a scanning step based on a total number of scanning windows (of a particular size, for instance) that can fit within an image size. In some configurations, the image scanning module 1488 may determine the number of scanning windows that can fit within an image by comparing the size of the image and the size of the scanning window. For example, if the image has a size of width multiplied by height (e.g., W*H), and the scanning window has a size of window width multiplied by window height (e.g., P*Q; W≥P and H≥Q), then the total number of scanning windows that can fit within the image is (W−P+1)*(H−Q+1). The scanning steps may be determined to be proportional to the total number of scanning windows in the image. For example, in FIG. 7B, in one configuration of the image scanning module 1488, the scanning step is set to 1 for image I, and the scanning steps of image H is set to the largest integer that is smaller than or equal to (# Scanning-Window of H)/(# ScanningWindow of I). Similarly, the scanning steps of image A is set to the largest integer that is smaller than or equal to (# ScanningWindow of A)/(# ScanningWindow of I).

Setting the number of scanning steps may approximately balance the scanning windows at each scale level (e.g., octave) of the image pyramid. For example, setting the number of scanning steps may result in approximately the same number of computations at each octave level. Setting the number of scanning steps may accordingly balance detection accuracy and computation and/or power consumption. It should be noted that only image scales within a range of scales (e.g., 0.5× to 2×) of an object may be scanned as described above in some configurations.

It should be noted that the image scanning module 1488 may scan one or more subsequent frames in accordance with the scanning step. For example, the image scanning module 1488 may scan the images for a first image frame at the initial positions of scanning windows. For a second subsequent frame, the image scanning module 1488 may shift the scanning window starting position (by a whole scanning window, by a pixel, etc.) and so on.

The image scanning module 1488 may provide scanning results 1492. In some configurations, the scanning results may indicate whether an object is detected and/or a level of confidence of object detection for one or more scanning windows and/or frames.

In some configurations, the image scanning module 1488 may be implemented in the object tracking and detection module 104 described in connection with FIG. 1. For example, the object detector 108 described in connection with FIG. 1 may implement one or more of the scanning schemes described in connection with FIGS. 11-14 in order to detect an object in an image.

Figure 15:
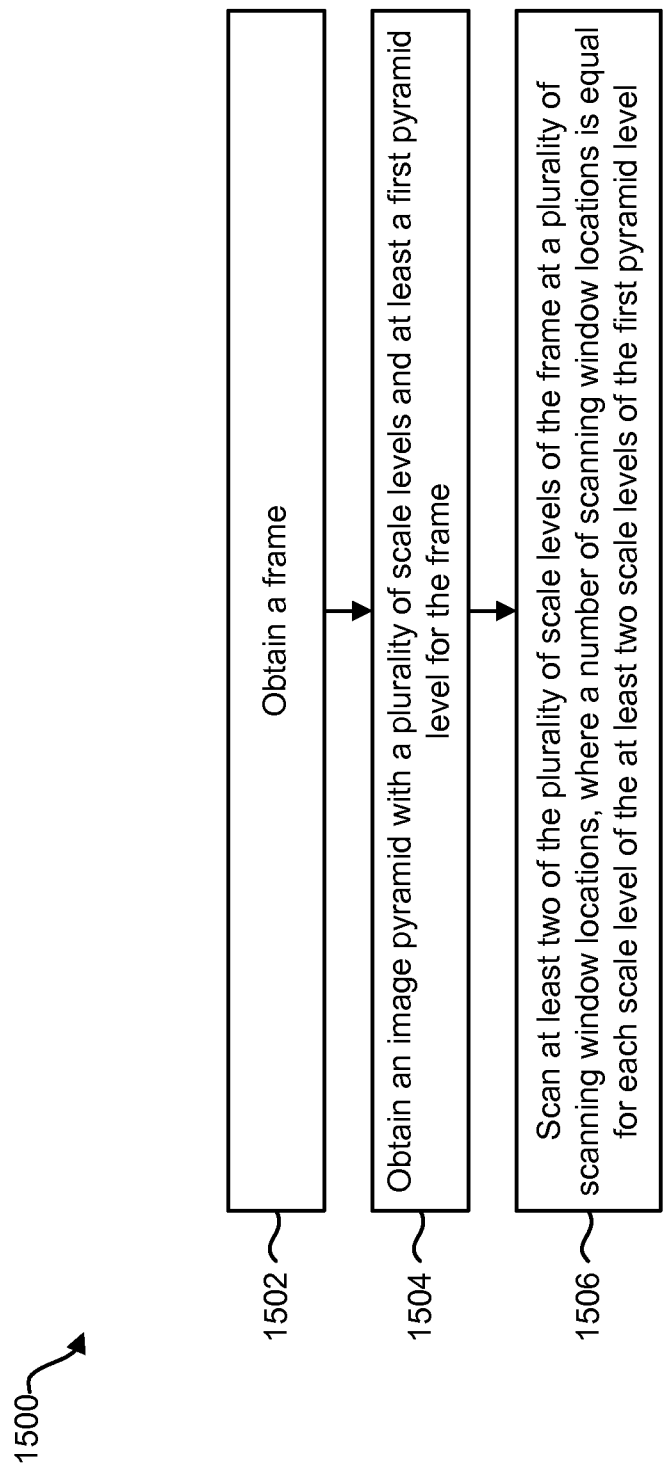
FIG. 15 is a flow diagram illustrating one configuration of a method for image scanning.

FIG. 15 is a flow diagram illustrating one configuration of a method 1500 for image scanning. The electronic device 1402 described in connection with FIG. 14 may perform the method 1500, for example.

The electronic device 1402 may obtain 1502 a frame 1490. This may be accomplished as described above in connection with FIG. 14, for example.

The electronic device 1402 may obtain 1504 an image pyramid with a plurality of scale levels and at least a first pyramid level for the frame 1490. This may be accomplished as described in connection with one or more of FIGS. 7B and 11-14, for example.

The electronic device 1402 may provide a scanning window. For example, the electronic device 1402 may have a predetermined scanning window size stored in memory. Additionally or alternatively, the electronic device 1402 may determine (e.g., calculate) the size of the scanning window. For example, the electronic device may determine the scanning window size as a proportion of the image size. In another example, the electronic device 1402 may determine the scanning window size based on a scanning window location limit (e.g., a maximum number of scanning windows that may be processed per frame). For example, the electronic device 1402 may be able to dedicate a limited number of processing cycles to scanning. The scanning window location limit may be a predetermined or calculated number of scanning window locations (with a number of pixels or a range of pixels) that the electronic device 1402 may process per frame. In some configurations, the electronic device 1402 may look up a scanning window size from a look up table.

The electronic device 1402 may scan 1506 at least two of the scale levels of the frame 1490 at a plurality of scanning window locations. A number of scanning window locations may be equal for each scale level of the at least two scale levels of the first pyramid level. Scanning 1506 each of the scale levels of the at least two scale levels of the frame 1490 may be accomplished as described above in connection with one or more of FIGS. 7B and 11-14.

FIG. 16 is a diagram that illustrates one example of image scanning in accordance with some configurations of the systems and methods disclosed herein. Specifically, FIG. 16 illustrates one example of image scanning over two frames 1696a-b. In this example, the rectangular grids represent images of image pyramids corresponding to (e.g., derived from) the frames 1696*a-b*. Each grid box represents a pixel. The boxes with heavy outlines in FIG. 16 illustrate scanning window pixels 1694. Each scanning window pixel 1694 is an upper-left pixel (e.g., starting location) of each scanning window. For example, the image at first pyramid level A 1607*a* and first scale level A 1601*a* includes 12 scanning window pixels 1694, where each of the scanning window pixels 1694 is an upper-left pixel of a corresponding scanning window. Accordingly, this image includes 12 scanning windows (not depicted for clarity). Each scanning window may cover a number of pixels (e.g., 16×16 pixels, 24×24 pixels, etc.). Accordingly, the scanning windows may overlap.

For simplicity, the images are illustrated in dimensions of pixels. It should be noted that each scanning window may cover a number of pixels. The images given in the example of FIG. 16 have relatively small dimensions for ease of illustration. It should be noted that the image dimensions may be larger (e.g., much larger) and/or smaller than the images given in FIG. 16. In the example described in connection with FIG. 16, the image sizes may be derived in accordance with the pyramid described in connection with FIG. 11. For instance, the images at the first pyramid level A 1607*a* include an image with dimensions 16×12 at the first scale level A 1601*a*, an image with dimensions 8×6 at the second scale level A 1603*a* and an image with dimensions 4×3 at the third scale level A 1605*a*. Furthermore, the images at the second pyramid level A 1609*a* include an image with dimensions 13×10 at the first scale level A 1601*a*, an image with dimensions 6×5 at the second scale level A 1603*a* and an image with dimensions 3×2 at the third scale level A 1605*a*. Additionally, the images at the third pyramid level A 1611*a* include an image with dimensions 10×8 at the first scale level A 1601*a*, an image with dimensions 5×4 at the second scale level A 1603*a* and an image with dimensions 3×2 at the third scale level A 1605*a*. The images corresponding to frame B 1696*b* at the first pyramid level B 1607*b*, the second pyramid level B 1609*b*, the third pyramid level B 1611*b*, the first scale level B 1601*b*, the second scale level B 1601*b* and the third scale level B 1605*b* have the same sizes as those corresponding to frame A 1696*a*.

As can be observed in FIG. 16, the scale levels 1601, 1603, 1605 are arranged in octave sizes. Specifically, at the first pyramid level A 1607*a*, the dimensions of the second scale level A 1603*a* are half of the corresponding dimensions of the first scale level A 1601*a* and the dimensions of the third scale level A 1605*a* are half of the corresponding dimensions of the second scale level A 1603*a*.

The scanning window pixels 1694 in FIG. 16 illustrate that the number of scanning windows is equal for each scale level 1601, 1603, 1605 at the first pyramid level A 1607*a*. Specifically, each of the images at the first pyramid level A 1607*a* have 12 scanning windows, regardless of scale level or image size. As illustrated, the scanning windows at the first pyramid level A 1607*a* are located at all locations (e.g., pixels) of the image at the third scale level A 1605*a*, are located at only one fourth of the locations of the image at second scale level A 1603*a* and are located at only one sixteenth of the locations at the first scale level A 1601*a*. Accordingly, the scanning step per dimension is proportional to the dimensions of the images at the first pyramid level 1607.

For frame B 1696*b*, the scanning windows may be shifted (as shown by the corresponding scanning window pixels 1694, for example). As illustrated at the first pyramid level 1607*a-b*, all scanning window starting locations of the image at the third scale level 1605*a-b* are utilized at each frame 1696, while four frames will be required to scan from all of the starting locations for the second scale level 1603 and sixteen frames will be required to scan from all of the starting locations for the first scale level 1601. This scenario illustrates one advantage of some configurations of the systems and methods disclosed herein. In particular, larger images (e.g., higher resolution images, smaller objects in images) may be scanned with a limited amount of computation in trade for slower detection speed and/or lower accuracy. This may be important, particularly in implementations where scanning high resolution images at high frame rates may overwhelm the processing capability of a device (e.g., smartphone, tablet, etc.).

As further illustrated in FIG. 16, the number of scanning windows for each progressively higher pyramid level 1609 may be limited to be less than or equal to the number of scanning windows for the image at the first pyramid level 1607. For example, for the first scale level A 1601*a*, the image at the first pyramid level A 1607*a* has 12 scanning windows, the image at the second pyramid level A 1609*a* has 12 scanning windows and the image at the third pyramid level A 1611*a* has six scanning windows. Accordingly, the computation for each scale level 1601, 1603, 1605 is characterized by (e.g., limited by) the number of scanning windows of the first pyramid level 1607 multiplied by the number of pyramid levels 1607, 1609, 1611. For example, the computation for the first scale level A 1601*a* will be limited to be less than or equal to the processing needed to scan 12 scanning windows multiplied by three pyramid levels 1607, 1609, 1611 (e.g., first scale level A processing=processing for 30 scanning windows≤processing for 12 scanning windows*3). In some configurations (e.g., at higher resolutions), the computation required to process each scale level becomes approximately equal, since the number of scanning windows is the same or nearly the same at each scale level.

While FIG. 16 illustrates that the scanning windows at each level may correspond in position (e.g., the first scanning window pixel 1694 at each scale level A 1601*a*, 1603*a*, 1605*a* is at a width and height index of (0, 0)), other approaches may be utilized. For example, the scanning windows may be initialized at non-corresponding positions at different scale levels. For instance, for the first pyramid level A 1607*a*, the first scanning window pixel 1694 (and the corresponding scanning window) at the first scale level A 1601*a* could be initialized at (0, 0) and the first scanning window pixel 1694 (and the corresponding scanning window) at the second scale level A 1603*a* could be initialized at a width and height index of (1, 0). In this way, different scanning locations may be covered more diversely.

In some configurations, the scanning windows may be initialized (e.g., may be positioned initially) at or near a last detected object position. For example, if an object was last detected at indices (2, 1) in a previous frame, the first scanning window may be positioned at (2, 1) (or (1, 1), for example).

FIG. 17A is a graph that illustrates a number of scanning windows 1713 versus image size 1715 in accordance with some configurations of the systems and methods disclosed herein. In FIG. 17A, the solid curves illustrate an approach, where increasing the image size also increases the number of scanning windows. The dashed lines illustrate some configurations of the systems and methods disclosed herein. As illustrated, the number of scanning windows may be limited or approximately constant as image size increases. In particular, the number of scanning windows may be approximately the same regardless of image size. In the known approach, for example, increasing the image size would require more scanning windows per frame. In one approach in accordance with the systems and methods disclosed herein, however, the number of scanning windows may be maintained approximately constant as the size of the image increases, at the expense of taking more frames to complete a full scan of all scan locations. This may enable scans of higher resolution images at high frame rates, even in implementations where processing capability is particularly constrained.

Figure 17B:
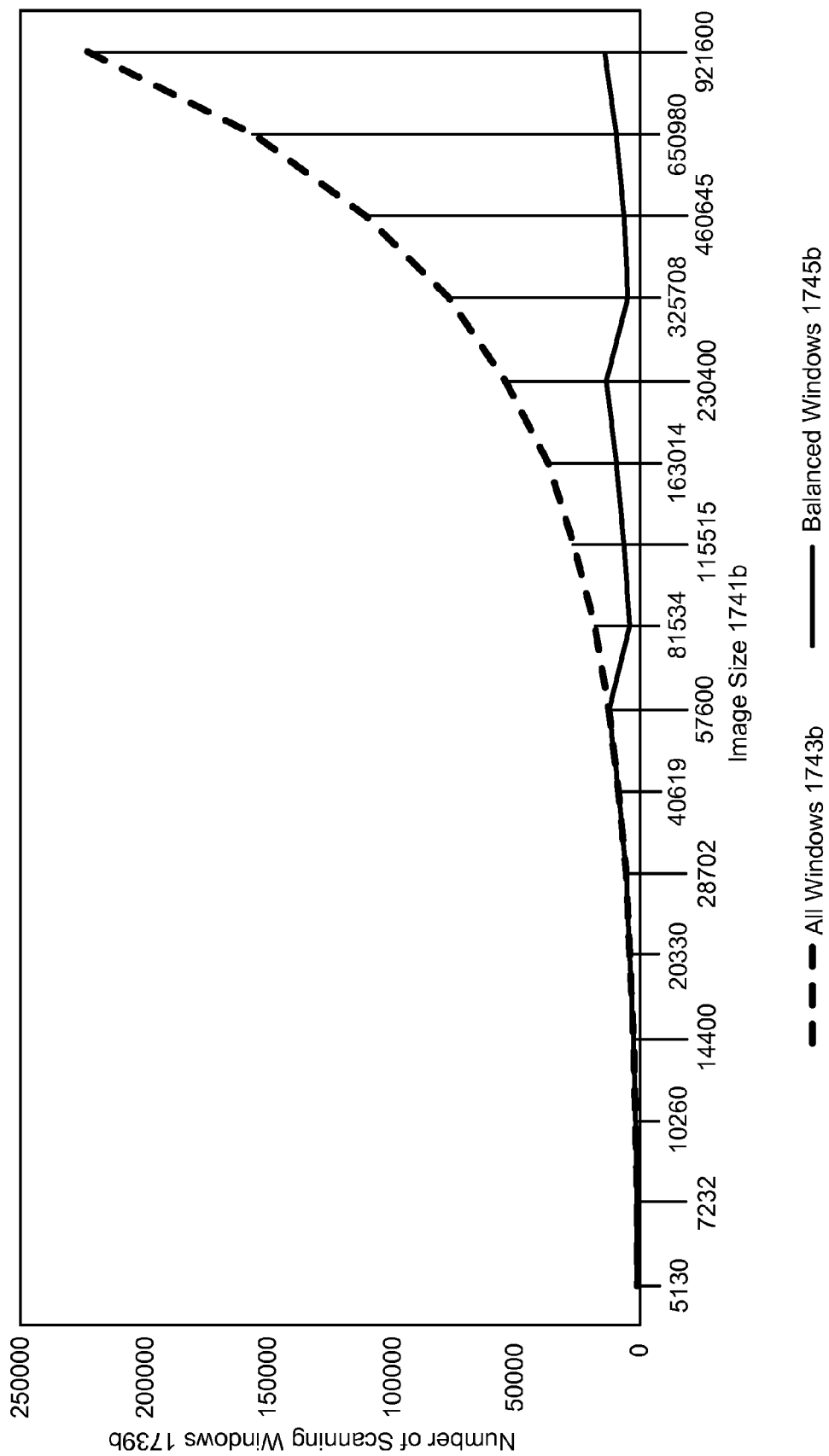
FIG. 17B is a graph illustrating an example of an approach where all possible window locations are scanned in comparison with an example of an approach of the systems and methods disclosed herein where the number of window locations scanned is balanced based on scale level.

FIG. 17B is a graph illustrating an example of an approach where all possible window locations are scanned in comparison with an example of an approach of the systems and methods disclosed herein where the number of window locations scanned is balanced based on scale level. The graph is illustrated in a number of scanning windows $1739b$ over image size $1741b$ (in pixels). In these examples, it is assumed that a scanning window has dimensions of 16×16 pixels. Table (1) provides a comparison between the number of scanning windows when all windows $1743b$ are scanned and the number of scanning windows when balanced windows $1745b$ are scanned. In the example where all windows $1743b$ are scanned (e.g., scanning step=1) and where one scanning window is placed for every two pixels, the total number of scanning windows $1739b$ increases dramatically as the image size $1741b$ increases. In the balanced windows $1745b$ approach, however, where the scanning step varies based on the scale level (e.g., octave level), the number of scanning windows $1739b$ is limited (or approximately constant) as image size $1741b$ increases as illustrated in Table (1) and FIG. 17B.

TABLE (1)

| Octave Level | Pyramid Level | Image Width (pixels) | Image Height (pixels) | Image Size (pixels) | Number of Scanning Windows (All) | Scanning Step | Number of Scanning Windows (Balanced) |
|---|---|---|---|---|---|---|---|
| 0 | 0 | 1280 | 720 | 921600 | 223449 | 4 | 13965 |
| 0 | 1 | 1076 | 605 | 650980 | 156645 | 4 | 9790 |
| 0 | 2 | 905 | 509 | 460645 | 109915 | 4 | 6869 |
| 0 | 3 | 761 | 428 | 325708 | 77211 | 4 | 4825 |
| 1 | 0 | 640 | 360 | 230400 | 54149 | 2 | 13537 |
| 1 | 1 | 538 | 303 | 163014 | 37728 | 2 | 9432 |
| 1 | 2 | 453 | 255 | 115515 | 26280 | 2 | 6570 |
| 1 | 3 | 381 | 214 | 81534 | 18300 | 2 | 4575 |
| 2 | 0 | 320 | 180 | 57600 | 12699 | 1 | 12699 |
| 2 | 1 | 269 | 151 | 40619 | 8636 | 1 | 8636 |
| 2 | 2 | 226 | 127 | 28702 | 5936 | 1 | 5936 |
| 2 | 3 | 190 | 107 | 20330 | 4048 | 1 | 4048 |
| 3 | 0 | 160 | 90 | 14400 | 2774 | 1 | 2774 |
| 3 | 1 | 135 | 76 | 10260 | 1860 | 1 | 1860 |
| 3 | 2 | 113 | 64 | 7232 | 1225 | 1 | 1225 |
| 3 | 3 | 95 | 54 | 5130 | 800 | 1 | 800 |

Figure 17C:
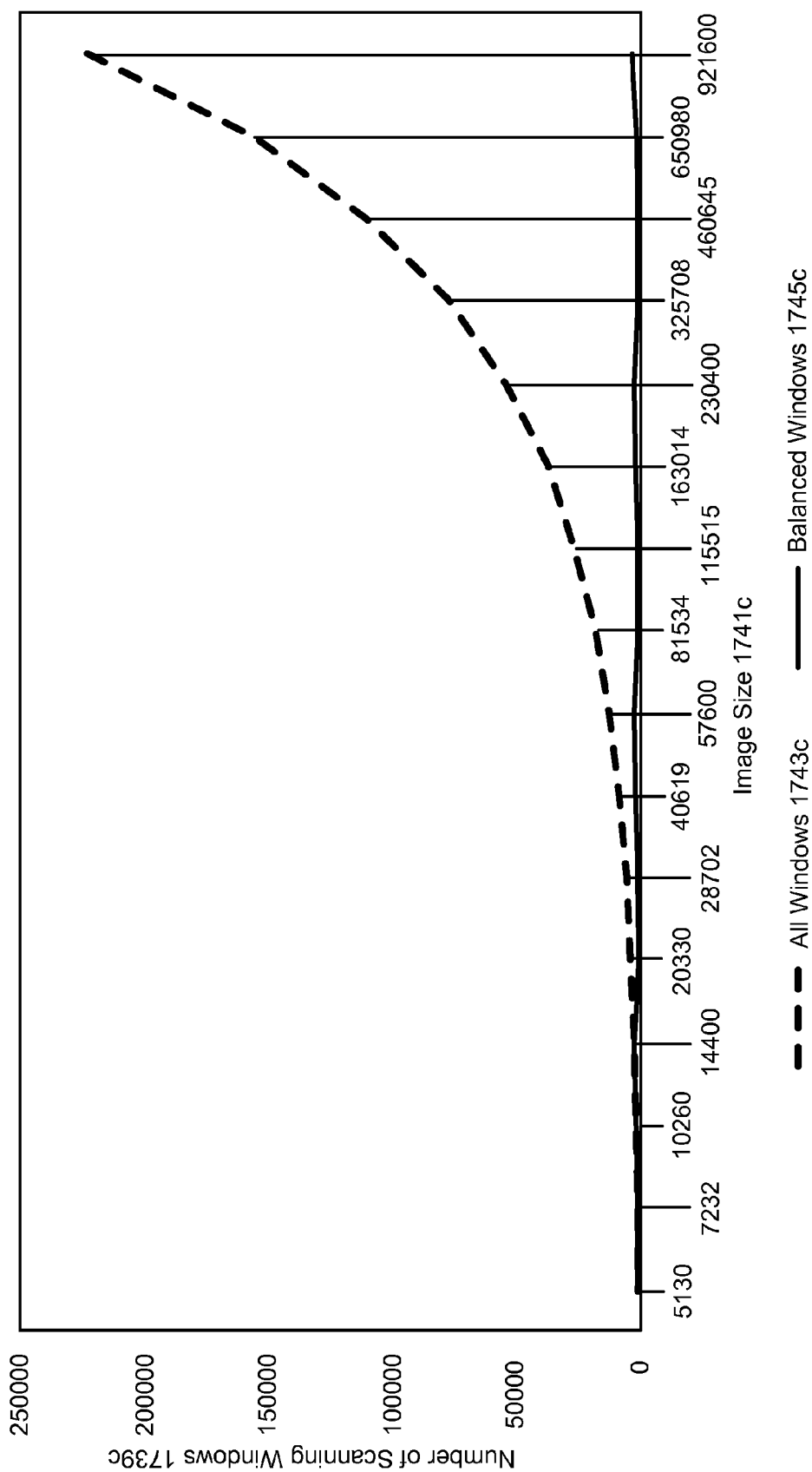
FIG. 17C is a graph illustrating an example of an approach where all possible window locations are scanned in comparison with another example of an approach of the systems and methods disclosed herein where the number of window locations scanned is balanced based on scale level.

FIG. 17C is a graph illustrating an example of an approach where all possible window locations are scanned in comparison with another example of an approach of the systems and methods disclosed herein where the number of window locations scanned is balanced based on scale level. The graph is illustrated in a number of scanning windows $1739c$ over image size $1741c$ (in pixels). In these examples, it is assumed that a scanning window has dimensions of 16×16 pixels. Table (2) provides a comparison between the number of scanning windows when all windows $1743c$ are scanned and the number of scanning windows when balanced windows $1745c$ are scanned. In the example where all windows $1743c$ are scanned (e.g., scanning step=1) and where one scanning window is placed for every two pixels, the total number of scanning windows $1739c$ increases dramatically as the image size $1741c$ increases. In the balanced windows $1745c$ approach, however, where the scanning step varies based on the scale level (e.g., octave level), the number of scanning windows $1739c$ is limited (or approximately constant) as image size $1741c$ increases as illustrated in Table (2) and FIG. 17C.

TABLE (2)

| Octave Level | Pyramid Level | Image Width (pixels) | Image Height (pixels) | Image Size (pixels) | Number of Scanning Windows (All) | Scanning Step | Number of Scanning Windows (Balanced) |
|---|---|---|---|---|---|---|---|
| 0 | 0 | 1280 | 720 | 921600 | 223449 | 8 | 3491 |
| 0 | 1 | 1076 | 605 | 650980 | 156645 | 8 | 2447 |
| 0 | 2 | 905 | 509 | 460645 | 109915 | 8 | 1717 |
| 0 | 3 | 761 | 428 | 325708 | 77211 | 8 | 1206 |
| 1 | 0 | 640 | 360 | 230400 | 54149 | 4 | 3384 |
| 1 | 1 | 538 | 303 | 163014 | 37728 | 4 | 2358 |
| 1 | 2 | 453 | 255 | 115515 | 26280 | 4 | 1642 |
| 1 | 3 | 381 | 214 | 81534 | 18300 | 4 | 1143 |
| 2 | 0 | 320 | 180 | 57600 | 12699 | 2 | 3174 |
| 2 | 1 | 269 | 151 | 40619 | 8636 | 2 | 2159 |
| 2 | 2 | 226 | 127 | 28702 | 5936 | 2 | 1484 |
| 2 | 3 | 190 | 107 | 20330 | 4048 | 2 | 1012 |
| 3 | 0 | 160 | 90 | 14400 | 2774 | 1 | 2774 |
| 3 | 1 | 135 | 76 | 10260 | 1860 | 1 | 1860 |
| 3 | 2 | 113 | 64 | 7232 | 1225 | 1 | 1225 |
| 3 | 3 | 95 | 54 | 5130 | 800 | 1 | 800 |

Figure 18:
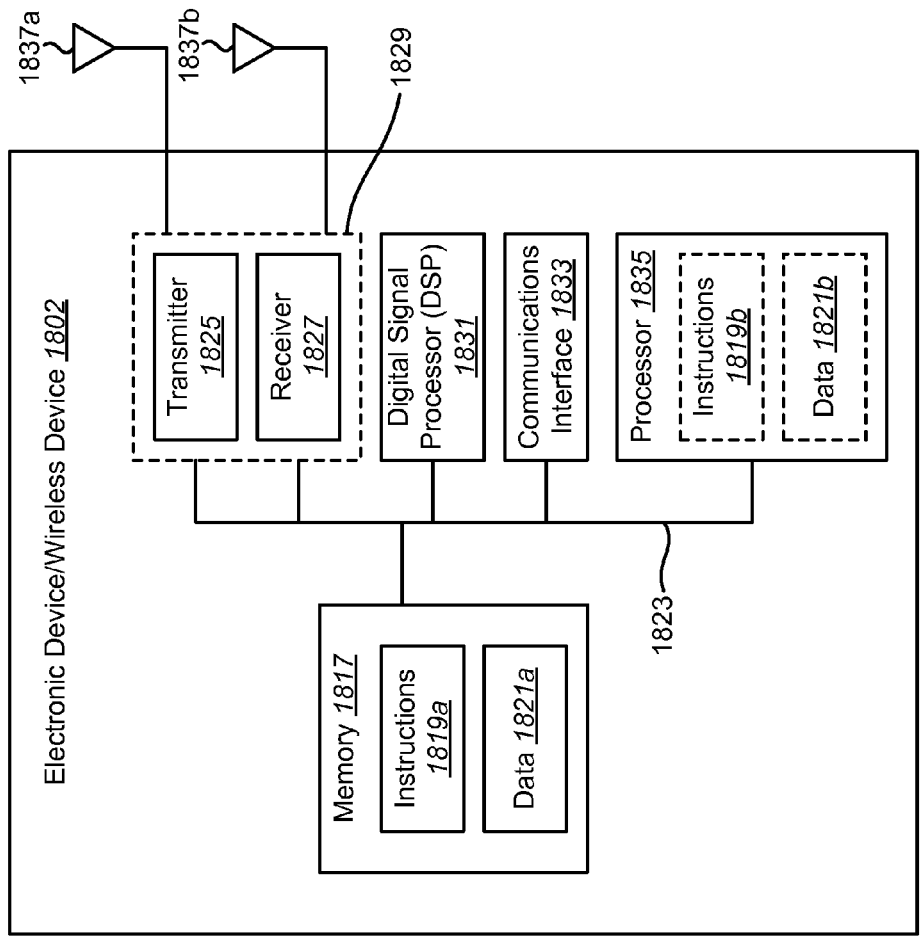
FIG. 18 illustrates certain components that may be included within an electronic device and/or wireless device configured to implement various configurations of the systems and methods disclosed herein.

FIG. 18 illustrates certain components that may be included within an electronic device and/or wireless device 1802. The electronic device/wireless device 1802 may be an access terminal, a mobile station, a user equipment (UE), a smartphone, a digital camera, a video camera, a tablet device, a laptop computer, etc., (e.g., an electronic device 102, 1402 illustrated in FIG. 1 and/or FIG. 14). The electronic device/wireless device 1802 includes a processor 1835. The processor 1835 may be a general purpose single- or multi-chip microprocessor (e.g., an ARM), a special purpose microprocessor (e.g., a digital signal processor (DSP)), a microcontroller, a programmable gate array, etc. The processor 1835 may be referred to as a central processing unit (CPU). Although just a single processor 1835 is shown in the electronic device/wireless device 1802, in an alternative configuration, a combination of processors (e.g., an ARM and DSP) could be used.

The electronic device/wireless device 1802 also includes memory 1817. The memory 1817 may be any electronic component capable of storing electronic information. The memory 1817 may be embodied as random access memory (RAM), read-only memory (ROM), magnetic disk storage media, optical storage media, flash memory devices in RAM, on-board memory included with the processor, EPROM memory, EEPROM memory, registers, and so forth, including combinations thereof.

Data $1821a$ and instructions $1819a$ may be stored in the memory 1817. The instructions $1819a$ may be executable by the processor 1835 to implement one or more of the methods described herein. Executing the instructions $1819a$ may involve the use of the data that is stored in the memory 1817. When the processor 1835 executes the instructions 1819, various portions of the instructions $1819b$ may be loaded onto the processor 1835, and various pieces of data $1821b$ may be loaded onto the processor 1835.

The electronic device/wireless device 1802 may also include a transmitter 1825 and a receiver 1827 to allow transmission and reception of signals to and from the electronic device/wireless device 1802. The transmitter 1825 and receiver 1827 may be collectively referred to as a transceiver 1829. Multiple antennas 1837*a-b* may be electrically coupled to the transceiver 1829. The electronic device/wireless device 1802 may also include (not shown) multiple transmitters, multiple receivers, multiple transceivers and/or additional antennas.

The electronic device/wireless device 1802 may include a digital signal processor (DSP) 1831. The electronic device/wireless device 1802 may also include a communications interface 1833. The communications interface 1833 may allow enable one or more kinds of input and/or output. For example, the communications interface 1833 may include one or more ports and/or communication devices for linking other devices to the electronic device/wireless device 1802. Additionally or alternatively, the communications interface 1933 may include one or more other interfaces (e.g., touchscreen, keypad, keyboard, microphone, camera, etc.). For example, the communication interface 1833 may enable a user to interact with the electronic device/wireless device 1802.

The various components of the electronic device/wireless device 1802 may be coupled together by one or more buses, which may include a power bus, a control signal bus, a status signal bus, a data bus, etc. For the sake of clarity, the various buses are illustrated in FIG. 18 as a bus system 1823.

In accordance with the present disclosure, a circuit, in an electronic device, may be adapted to obtain a frame (e.g., image frame). The same circuit, a different circuit, or a second section of the same or different circuit may be adapted to obtain an image pyramid comprising multiple with scale levels and a first pyramid level for the frame. The second section may advantageously be coupled to the first section, or it may be embodied in the same circuit as the first section. In addition, the same circuit, a different circuit, or a third section of the same or different circuit may be adapted to scan each of the scale levels, where a number of scanning windows is equal for each scale level in at the first pyramid level. In addition, the same circuit, a different circuit, or a fourth section of the same or different circuit may be adapted to control the configuration of the circuit(s) or section(s) of circuit(s) that provide the functionality described above.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The functions described herein may be implemented in software or firmware being executed by hardware. The functions may be stored as one or more instructions on a computer-readable medium. The terms "computer-readable medium" or "computer-program product" refers to any tangible storage medium that can be accessed by a computer or a processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers. It should be noted that a computer-readable medium may be tangible and non-transitory. The term "computer-program product" refers to a computing device or processor in combination with code or instructions (e.g., a "program") that may be executed, processed or computed by the computing device or processor. As used herein, the term "code" may refer to software, instructions, code or data that is/are executable by a computing device or processor.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for object detection by an electronic device, comprising:
   obtaining an image pyramid comprising a plurality of pyramid levels for a frame and a plurality of scale levels for each pyramid level;
   providing a scanning window;
   setting a scanning step size that is proportional to dimensions of the frame at a scale level, wherein the scanning step size is uniform for the plurality of pyramid levels corresponding to a same scale level;
   scanning at least two of the plurality of scale levels of the frame at a plurality of scanning window locations, wherein a number of scanning window locations is equal for each scale level of the at least two scale levels of a first pyramid level; and
   detecting an object based on the scanning.

2. The method of claim 1, wherein computation by the electronic device for each of the at least two scale levels of the frame is characterized by the number of scanning window locations multiplied by a number of pyramid levels.

3. The method of claim 1, further comprising:
   determining a scanning step for each of the at least two scale levels; and
   scanning the at least two scale levels of a subsequent frame, wherein a quantity of the subsequent frames to scan all of the scanning window locations is greater at a lower scale level in comparison to a higher scale level.

4. The method of claim 1, further comprising selecting a range of scale levels for scanning the frame among the plurality of scale levels, wherein only scale levels within the range of scale levels are scanned.

5. The method of claim 4, further comprising selecting a second range of scale levels among a plurality of scale levels of a subsequent frame for scanning the subsequent frame, wherein adjacent or non-adjacent scale levels are scanned.

6. The method of claim 1, further comprising determining a scanning step for each of the at least two scale levels, wherein a first dimension scanning step is proportional to a first dimension of an image at the first pyramid level for each of the scale levels scanned and a second dimension scanning step is proportional to a second dimension of the image at the first pyramid level for each of the scale levels scanned.

7. The method of claim 1, wherein the number of scanning window locations corresponding to each of one or more additional pyramid levels of a scale level is less than or equal to the number of scanning window locations corresponding to the first pyramid level of the scale level.

8. The method of claim 1, wherein the plurality of scale levels are octave levels.

9. An electronic device for object detection, comprising:
   a processor;
   memory in electronic communication with the processor;
   instructions stored in memory, the instructions being executable to:
   obtain an image pyramid comprising a plurality of pyramid levels for a frame and a plurality of scale levels for each pyramid level;
   provide a scanning window;
   set a scanning step size that is proportional to dimensions of the frame at a scale level, wherein the scanning step size is uniform for the plurality of pyramid levels corresponding to a same scale level;
   scan at least two of the plurality of scale levels of the frame at a plurality of scanning window locations, wherein a number of scanning window locations is equal at each scale level of the at least two scale levels of the first pyramid level; and
   detect an object based on the scanning.

10. The electronic device of claim 9, wherein computation by the electronic device for each of the at least two scale levels of the frame is characterized by the number of scanning window locations multiplied by a number of pyramid levels.

11. The electronic device of claim 9, wherein the instructions are further executable to:
    determine a scanning step for each of the at least two scale levels; and
    scan the at least two scale levels of a subsequent frame, wherein a quantity of the subsequent frames to scan all of the scanning window locations is greater at a lower scale level in comparison to a higher scale level.

12. The electronic device of claim 9, wherein the instructions are further executable to select a range of scale levels for scanning the frame among the plurality of scale levels, wherein only scale levels within the range of scale levels are scanned.

13. The electronic device of claim 12, wherein the instructions are further executable to select a second range of scale levels among a plurality of scale levels of a subsequent frame for scanning the subsequent frame, wherein adjacent or non-adjacent scale levels are scanned.

14. The electronic device of claim 9, wherein the instructions are further executable to determine a scanning step for each of the at least two scale levels, wherein a first dimension scanning step is proportional to a first dimension of an image at the first pyramid level for each of the scale levels scanned and a second dimension scanning step is proportional to a second dimension of the image at the first pyramid level for each of the scale levels scanned.

15. The electronic device of claim 9, wherein the number of scanning window locations corresponding to each of one or more additional pyramid levels of a scale level is less than or equal to the number of scanning window locations corresponding to the first pyramid level of the scale level.

16. The electronic device of claim 9, wherein the plurality of scale levels are octave levels.

17. An apparatus for object detection, comprising:
    means for obtaining an image pyramid comprising a plurality of pyramid levels for a frame and a plurality of scale levels for each pyramid level;
    means for providing a scanning window;
    means for setting a scanning step size that is proportional to dimensions of the frame at a scale level, wherein the scanning step size is uniform for the plurality of pyramid levels corresponding to a same scale level;
    means for scanning at least two of the plurality of scale levels of the frame at a plurality of scanning window locations, wherein a number of scanning window locations is equal for each scale level of the at least two scale levels of the first pyramid level; and means for detecting an object based on the scanning.

18. The apparatus of claim 17, wherein computation by the apparatus for each of the at least two scale levels of the frame is characterized by the number of scanning window locations multiplied by a number of pyramid levels.

19. The apparatus of claim 17, further comprising means for selecting a range of scale levels for scanning the frame among the plurality of scale levels, wherein only scale levels within the range of scale levels are scanned.

20. The apparatus of claim 17, further comprising means for determining a scanning step for each of the at least two scale levels, wherein a first dimension scanning step is proportional to a first dimension of an image at the first pyramid level for each of the scale levels scanned and a second dimension scanning step is proportional to a second dimension of the image at the first pyramid level for each of the scale levels scanned.

21. A computer-program product for object detection, comprising a non-transitory computer-readable medium having instructions thereon, the instructions comprising:

code for causing an electronic device to obtain an image pyramid comprising a plurality of pyramid levels for a frame and a plurality of scale levels for each pyramid level;

code for causing the electronic device to provide a scanning window;

code for causing the electronic device to set a scanning step size that is proportional to dimensions of the frame at a scale level, wherein the scanning step size is uniform for the plurality of pyramid levels corresponding to a same scale level;

code for causing the electronic device to scan at least two of the plurality of scale levels of the frame at a plurality of scanning window locations, wherein a number of scanning window locations is equal for each scale level of the at least two scale levels of the first pyramid level; and code for causing the electronic device to detect an object based on the scanning.

22. The computer-program product of claim 21, wherein computation by the electronic device for each of the at least two scale levels of the frame is characterized by the number of scanning window locations multiplied by a number of pyramid levels.

23. The computer-program product of claim 21, further comprising code for causing the electronic device to select a range of scale levels for scanning the frame among the plurality of scale levels, wherein only scale levels within the range of scale levels are scanned.

24. The computer-program product of claim 21, further comprising code for causing the electronic device to determine a scanning step for each of the at least two scale levels, wherein a first dimension scanning step is proportional to a first dimension of an image at the first pyramid level for each of the scale levels scanned and a second dimension scanning step is proportional to a second dimension of the image at the first pyramid level for each of the scale levels scanned.

* * * * *